US010345798B2

(12) United States Patent
Ueda et al.

(10) Patent No.: US 10,345,798 B2
(45) Date of Patent: Jul. 9, 2019

(54) SAFETY SYSTEM, PROGRAM, AND METHOD

(71) Applicant: OMRON Corporation, Kyoto-shi, Kyoto (JP)

(72) Inventors: Takamasa Ueda, Kusatsu (JP); Asahi Matsui, Takatsuki (JP); Nobuyuki Takuma, Kusatsu (JP); Hiromu Suganuma, Ritto (JP); Ryosuke Fujimura, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 169 days.

(21) Appl. No.: 15/600,944

(22) Filed: May 22, 2017

(65) Prior Publication Data

US 2018/0004181 A1      Jan. 4, 2018

(30) Foreign Application Priority Data

Jun. 30, 2016   (JP) ................. 2016-129846

(51) Int. Cl.
| | |
|---|---|
| *G06F 9/44* | (2018.01) |
| *G05B 21/00* | (2006.01) |
| *G05B 6/00* | (2006.01) |
| *G05B 13/00* | (2006.01) |
| *G05B 9/00* | (2006.01) |
| *G05B 15/00* | (2006.01) |

(Continued)

(52) U.S. Cl.
CPC ............... *G05B 21/00* (2013.01); *G05B 6/00* (2013.01); *G05B 9/00* (2013.01); *G05B 13/00* (2013.01); *G05B 15/00* (2013.01); *G05B 19/0428* (2013.01); *G05B 23/02* (2013.01); *G05B 2219/24024* (2013.01)

(58) Field of Classification Search
CPC .. G05B 19/056; G05B 19/0426; G05B 15/02; G05B 17/02; G05B 9/02; G05B 21/00; G05B 6/00; G05B 9/00; G05B 13/00; G05B 15/00; G06F 3/04842
See application file for complete search history.

(56) References Cited

U.S. PATENT DOCUMENTS

| | | | |
|---|---|---|---|
| 6,369,836 B1 * | 4/2002 | Larson ............... | G05B 19/0426 715/763 |
| 6,941,261 B1 * | 9/2005 | Quinn ................. | G05B 19/056 703/27 |
| 2005/0010332 A1 | 1/2005 | Abe et al. | |

(Continued)

FOREIGN PATENT DOCUMENTS

JP      2005-31778 A      2/2005

*Primary Examiner* — Tuan A Vu
(74) *Attorney, Agent, or Firm* — Metrolexis Law Group, PLLC

(57) ABSTRACT

A safety system according to one or more embodiments including a safety controller that executes a safety program. The safety system includes: a collection unit configured to collect an input value over a predetermined period, the input value being a value of an input signal selected previously in one or a plurality of input signals input to the safety controller; and a visualization unit configured to reproduce a behavior of the safety program over the predetermined period based on the input value collected over the predetermined period, and to express visually an operating state of the safety program at an appointed point of time in the predetermined period.

19 Claims, 17 Drawing Sheets

(51) Int. Cl.
*G05B 19/042* (2006.01)
*G05B 23/02* (2006.01)

(56) References Cited

U.S. PATENT DOCUMENTS

| | | | |
|---|---|---|---|
| 2012/0004744 A1* | 1/2012 | Reusch | G05B 19/0426 700/86 |
| 2013/0138227 A1* | 5/2013 | Gohr | G05B 9/02 700/80 |
| 2015/0045958 A1* | 2/2015 | Nagata | G05B 15/02 700/275 |
| 2015/0169736 A1* | 6/2015 | MacPherson | G06F 3/04842 715/739 |
| 2017/0102678 A1* | 4/2017 | Nixon | G05B 17/02 |
| 2018/0292798 A1* | 10/2018 | Law | G05B 19/056 |

* cited by examiner

FIG. 4

| Time | Reset | EMO NC (0) | EMO NC (1) | Door SW NC(0) | Door SW NC(1) | SLC (0) | SLC (1) | FeedBack [#02] | FeedBack [#00] | Safety Relay [#00](0) | Safety Relay [#00](1) | Safety Relay [#02](0) | Safety Relay [#02](1) |
|---|---|---|---|---|---|---|---|---|---|---|---|---|---|
| 0:00:00 | 0 | 1 | 1 | 1 | 1 | 1 | 1 | 1 | 1 | 0 | 0 | 0 | 0 |
| 0:00:01 | 1 | 1 | 1 | 1 | 1 | 1 | 1 | 1 | 1 | 0 | 0 | 0 | 0 |
| 0:00:02 | 1 | 1 | 1 | 1 | 1 | 1 | 1 | 1 | 1 | 0 | 0 | 0 | 0 |
| 0:00:03 | 1 | 1 | 1 | 1 | 1 | 1 | 1 | 1 | 1 | 0 | 0 | 0 | 0 |
| 0:00:04 | 1 | 1 | 1 | 1 | 1 | 1 | 1 | 1 | 1 | 0 | 0 | 0 | 0 |
| 0:00:05 | 1 | 1 | 1 | 1 | 1 | 1 | 1 | 0 | 0 | 1 | 1 | 1 | 1 |
| 0:00:06 | 0 | 1 | 1 | 1 | 1 | 1 | 1 | 0 | 0 | 1 | 1 | 1 | 1 |
| 0:00:07 | 0 | 1 | 1 | 1 | 1 | 1 | 1 | 0 | 0 | 1 | 1 | 1 | 1 |
| 0:00:08 | 0 | 1 | 1 | 1 | 1 | 1 | 1 | 0 | 0 | 1 | 1 | 1 | 1 |
| 0:00:09 | 0 | 1 | 1 | 1 | 1 | 1 | 1 | 0 | 0 | 1 | 1 | 1 | 1 |
| 0:00:10 | 0 | 0 | 0 | 1 | 1 | 1 | 1 | 1 | 1 | 0 | 0 | 0 | 0 |
| 0:00:11 | 0 | 0 | 0 | 1 | 1 | 1 | 1 | 1 | 1 | 0 | 0 | 0 | 0 |
| 0:00:12 | 0 | 1 | 1 | 1 | 1 | 1 | 1 | 1 | 1 | 0 | 0 | 0 | 0 |
| 0:00:13 | 1 | 1 | 1 | 1 | 1 | 1 | 1 | 1 | 1 | 0 | 0 | 0 | 0 |
| 0:00:14 | 1 | 1 | 1 | 1 | 1 | 1 | 1 | 1 | 1 | 0 | 0 | 0 | 0 |
| 0:00:15 | 1 | 1 | 1 | 1 | 1 | 1 | 1 | 1 | 1 | 0 | 0 | 0 | 0 |
| 0:00:16 | 1 | 1 | 1 | 1 | 1 | 1 | 1 | 0 | 0 | 1 | 1 | 1 | 1 |
| 0:00:17 | 0 | 1 | 1 | 1 | 1 | 1 | 1 | 0 | 0 | 1 | 1 | 1 | 1 |
| 0:00:18 | 0 | 1 | 1 | 1 | 1 | 1 | 1 | 0 | 0 | 1 | 1 | 1 | 1 |
| 0:00:19 | 0 | 1 | 1 | 1 | 1 | 1 | 1 | 0 | 0 | 1 | 1 | 1 | 1 |
| 0:00:20 | 0 | 1 | 1 | 1 | 1 | 1 | 1 | 0 | 0 | 1 | 1 | 0 | 0 |
| 0:00:21 | 0 | 1 | 1 | 0 | 0 | 1 | 1 | 1 | 0 | 1 | 1 | 0 | 0 |
| 0:00:22 | 0 | 1 | 1 | 0 | 0 | 1 | 1 | 1 | 0 | 1 | 1 | 0 | 0 |
| 0:00:23 | 0 | 1 | 1 | 0 | 0 | 1 | 1 | 1 | 0 | 1 | 1 | 0 | 0 |
| 0:00:24 | 0 | 1 | 1 | 0 | 0 | 1 | 1 | 1 | 0 | 1 | 1 | 0 | 0 |
| 0:00:25 | 0 | 1 | 1 | 1 | 1 | 1 | 1 | 1 | 0 | 1 | 1 | 0 | 0 |
| 0:00:26 | 0 | 1 | 1 | 1 | 1 | 1 | 1 | 1 | 0 | 1 | 1 | 0 | 0 |
| 0:00:27 | 1 | 1 | 1 | 1 | 1 | 1 | 1 | 1 | 0 | 1 | 1 | 0 | 0 |
| 0:00:28 | 1 | 1 | 1 | 1 | 1 | 1 | 1 | 1 | 0 | 1 | 1 | 0 | 0 |
| 0:00:29 | 1 | 1 | 1 | 1 | 1 | 1 | 1 | 1 | 0 | 1 | 1 | 0 | 0 |
| 0:00:30 | 1 | 1 | 1 | 1 | 1 | 1 | 1 | 1 | 0 | 1 | 1 | 0 | 0 |
| 0:00:31 | 1 | 1 | 1 | 1 | 1 | 1 | 1 | 0 | 0 | 1 | 1 | 1 | 1 |
| 0:00:32 | 0 | 1 | 1 | 1 | 1 | 1 | 1 | 0 | 0 | 1 | 1 | 1 | 1 |
| 0:00:33 | 0 | 1 | 1 | 1 | 1 | 1 | 1 | 0 | 0 | 1 | 1 | 1 | 1 |
| 0:00:34 | 0 | 1 | 1 | 1 | 1 | 1 | 1 | 0 | 0 | 1 | 1 | 1 | 1 |
| 0:00:35 | 0 | 1 | 1 | 1 | 1 | 1 | 1 | 0 | 0 | 1 | 1 | 1 | 1 |
| 0:00:36 | 0 | 1 | 1 | 1 | 1 | 1 | 1 | 0 | 0 | 1 | 1 | 1 | 1 |
| 0:00:37 | 0 | 1 | 1 | 1 | 1 | 1 | 1 | 0 | 0 | 1 | 1 | 1 | 1 |
| 0:00:38 | 0 | 1 | 1 | 1 | 1 | 0 | 0 | 1 | 0 | 1 | 1 | 0 | 0 |
| 0:00:39 | 0 | 1 | 1 | 1 | 1 | 0 | 0 | 1 | 0 | 1 | 1 | 0 | 0 |
| 0:00:40 | 0 | 1 | 1 | 1 | 1 | 1 | 1 | 1 | 0 | 1 | 1 | 0 | 0 |
| 0:00:41 | 0 | 1 | 1 | 1 | 1 | 1 | 1 | 1 | 0 | 1 | 1 | 0 | 0 |
| 0:00:42 | 1 | 1 | 1 | 1 | 1 | 1 | 1 | 1 | 0 | 1 | 1 | 0 | 0 |
| 0:00:43 | 1 | 1 | 1 | 1 | 1 | 1 | 1 | 1 | 0 | 1 | 1 | 0 | 0 |
| 0:00:44 | 1 | 1 | 1 | 1 | 1 | 1 | 1 | 1 | 0 | 1 | 1 | 0 | 0 |
| 0:00:45 | 1 | 1 | 1 | 1 | 1 | 1 | 1 | 1 | 0 | 1 | 1 | 0 | 0 |
| 0:00:46 | 0 | 1 | 1 | 1 | 1 | 1 | 1 | 0 | 0 | 1 | 1 | 1 | 1 |
| 0:00:47 | 0 | 1 | 1 | 1 | 1 | 1 | 1 | 0 | 0 | 1 | 1 | 1 | 1 |
| 0:00:48 | 0 | 1 | 1 | 1 | 1 | 1 | 1 | 0 | 0 | 1 | 1 | 1 | 1 |
| 0:00:49 | 0 | 1 | 1 | 1 | 1 | 1 | 1 | 0 | 0 | 1 | 1 | 1 | 1 |
| 0:00:50 | 0 | 1 | 1 | 1 | 1 | 1 | 1 | 0 | 0 | 1 | 1 | 1 | 1 |

FIG. 5

| Time | Reset | EMO NC (0) | EMO NC (1) | Door SW NC(0) | Door SW NC(1) | SLC (0) | SLC (1) | FeedBack [#02] | FeedBack [#00] | Safety Relay [#00](0) | Safety Relay [#00](1) | Safety Relay [#02](0) | Safety Relay [#02](1) |
|---|---|---|---|---|---|---|---|---|---|---|---|---|---|
| 0:00:00 | 0 | 1 | 1 | 1 | 1 | 1 | 1 | 1 | 1 | 0 | 0 | 0 | 0 |
| 0:00:01 | 1 | 1 | 1 | 1 | 1 | 1 | 1 | 1 | 1 | 0 | 0 | 0 | 0 |
| 0:00:06 | 0 | 0 | 1 | 1 | 1 | 1 | 1 | 0 | 0 | 1 | 1 | 1 | 1 |
| 0:00:10 | 0 | 1 | 0 | 1 | 1 | 1 | 1 | 1 | 1 | 0 | 0 | 0 | 0 |
| 0:00:12 | 0 | 1 | 1 | 1 | 1 | 1 | 1 | 1 | 1 | 0 | 0 | 0 | 0 |
| 0:00:13 | 1 | 1 | 1 | 1 | 1 | 1 | 1 | 0 | 0 | 1 | 1 | 1 | 1 |
| 0:00:17 | 0 | 1 | 1 | 1 | 1 | 1 | 1 | 0 | 0 | 1 | 1 | 1 | 1 |
| 0:00:21 | 0 | 1 | 1 | 0 | 1 | 1 | 1 | 1 | 0 | 0 | 1 | 0 | 1 |
| 0:00:25 | 0 | 1 | 1 | 1 | 0 | 1 | 1 | 1 | 0 | 0 | 1 | 0 | 1 |
| 0:00:27 | 1 | 1 | 1 | 1 | 1 | 1 | 1 | 0 | 0 | 1 | 1 | 1 | 1 |
| 0:00:32 | 0 | 1 | 1 | 1 | 1 | 1 | 1 | 1 | 0 | 1 | 1 | 1 | 1 |
| 0:00:38 | 0 | 1 | 1 | 1 | 1 | 0 | 0 | 1 | 0 | 1 | 1 | 1 | 1 |
| 0:00:40 | 0 | 1 | 1 | 1 | 1 | 1 | 1 | 1 | 0 | 1 | 1 | 1 | 1 |
| 0:00:42 | 1 | 1 | 1 | 1 | 1 | 1 | 1 | 0 | 0 | 1 | 1 | 1 | 1 |
| 0:00:46 | 0 | 1 | 1 | 1 | 1 | 1 | 1 | 0 | 0 | 1 | 1 | 1 | 1 |
| ... | ... | ... | ... | ... | ... | ... | ... | ... | ... | ... | ... | ... | ... |

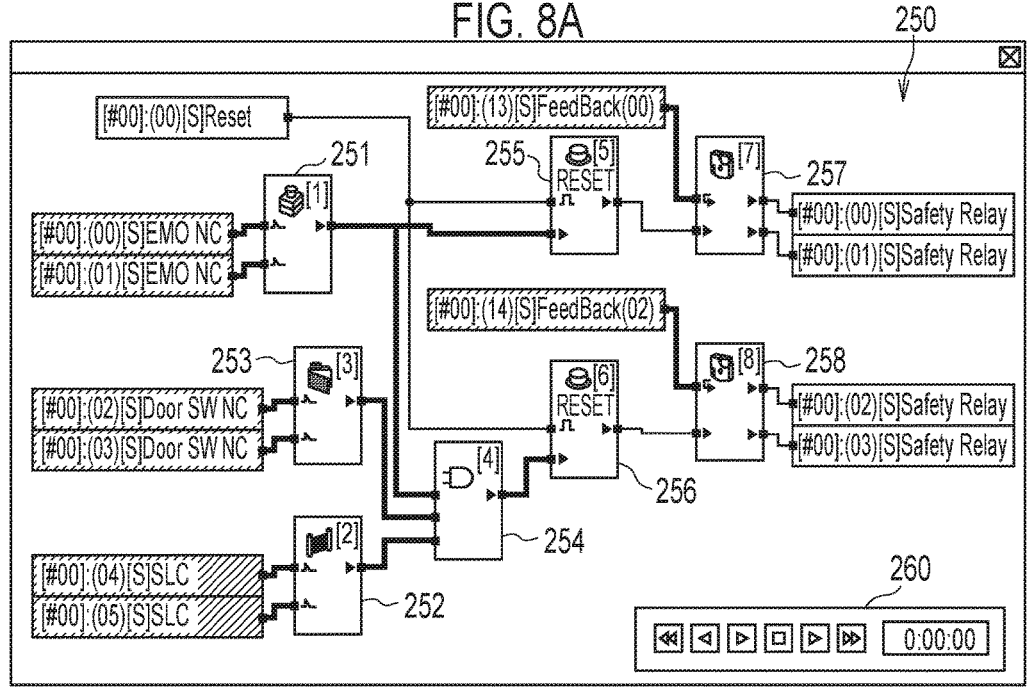
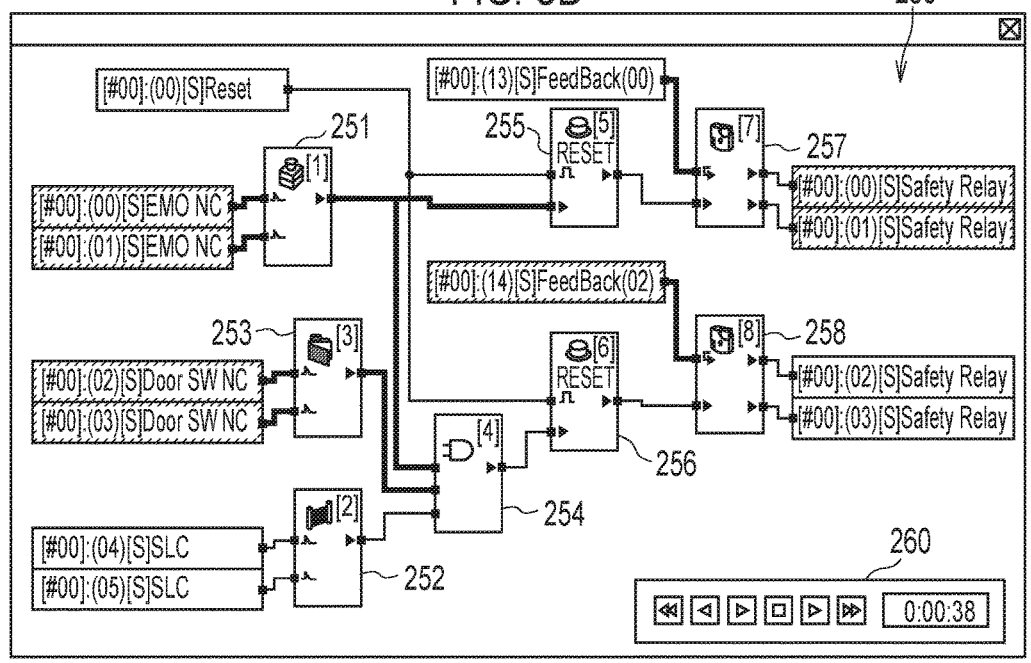

FIG. 14

| Collection target | Collection condition | |
|---|---|---|
| | Rising | Falling |
| ☑ EMO NC(0) | ☑ | ☑ |
| ☑ Safety Relay[#00](0) | ☐ | ☐ |
| ☑ Safety Relay[#00](1) | ☐ | ☐ |
| ☐ Safety Relay[#02](0) | ☐ | ☐ |
| ☐ Safety Relay[#02](1) | ☐ | ☐ |
| ☐ EMO NC(1) | ☐ | ☐ |
| ☑ Safety Relay[#00](0) | ☐ | ☐ |
| ☑ Safety Relay[#00](1) | ☐ | ☐ |
| ☐ Safety Relay[#02](0) | ☐ | ☐ |
| ☐ Safety Relay[#02](1) | ☐ | ☐ |
| ☐ Door SWNC(0) | ☐ | ☐ |
| ☐ Safety Relay[#02](0) | ☐ | ☐ |
| ☐ Safety Relay[#02](1) | ☐ | ☐ |
| ☐ Door SWNC(1) | ☐ | ☐ |
| ☐ Safety Relay[#02](0) | ☐ | ☐ |
| ☐ Safety Relay[#02](1) | ☐ | ☐ |
| ☑ SLC(0) | ☑ | ☑ |
| ☐ Safety Relay[#02](0) | ☐ | ☐ |
| ☐ Safety Relay[#02](1) | ☐ | ☐ |
| ☑ SLC(1) | ☑ | ☑ |
| ☐ Safety Relay[#02](0) | ☐ | ☐ |
| ☐ Safety Relay[#02](1) | ☐ | ☐ |

FIG. 15

| EMO NC (0) | EMO NC (1) | Door SW NC(0) | Door SW NC(1) | SLC (0) | SLC (1) |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 0 | 0 | 1 | 1 | 1 | 1 |
| 0 | 0 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| ⋮ | ⋮ | ⋮ | ⋮ | ⋮ | ⋮ | t0, t1: Collection range

Establishment of collection condition (at t1)

Time

SAFETY SYSTEM, PROGRAM, AND METHOD

CROSS-REFERENCE TO RELATED APPLICATION

This application is based on Japanese Patent Application No. 2016-129846 filed with the Japan Patent Office on Jun. 30, 2016, the entire contents of which are incorporated herein by reference.

FIELD

The present technology relates to a mechanism that maintains performance of a safety component.

BACKGROUND

It is necessary to use a safety component according to an international standard in order to safely use facilities or machines introduced in many production sites. The safety component prevents an automatic device such as a robot from threatening person's safety. The safety component includes a safety controller that executes a safety program, a detection unit that detects existence or entry of a person, an input unit that receives manipulation in emergency, and an output unit that actually stops a facility or a machine.

For example, JP-A-2005-031778 discloses a safety controller that provides safety output to a safety output control target based on input from the input unit and controls running of machinery as one of technologies for ensuring safety in the production site.

SUMMARY

When the safety component is disposed in the facility or the machine, the safety of a worker can be ensured. At the same time, possibly productivity is degraded by a malfunction of the safety component. As used herein, the malfunction means a state in which the safety component is operated when fundamentally the safety component should not be operated, or a state in which the safety component is unintentionally operated by an external factor.

In introducing the safety component, sufficient examination is performed at each of phases such as a design/production stage, an installation stage, and a trial run stage. However, it is conceivable that an initially-assumed environment changes after the introduction. Therefore, it is necessary to properly perform maintenance even after the introduction of the safety component.

There is a demand for a mechanism that properly perform the maintenance after the introduction of the safety component. That is, a method for maintaining performance of the safety component is provided.

According to one aspect of the present invention, a safety system includes: a safety controller configured to execute a safety program; a collection unit configured to collect an input value over a predetermined period, the input value being a value of an input signal selected previously in one or plural input signals input to the safety controller; and a visualization unit configured to reproduce a behavior of the safety program over the predetermined period based on the input value collected over the predetermined period, and to express visually an operating state of the safety program at an appointed point of time in the predetermined period.

It may be preferable that the visualization unit includes a unit configured to schematize and display a combination of commands included in the safety program.

It may be preferable that the visualization unit further includes a unit configured to change a display mode of a corresponding element included in the schematized display according to the input value, an internal value, and an output value, the internal value and the output value being calculated according to the input value.

It may be preferable that the visualization unit outputs a timing chart indicating the input value collected over the predetermined period together with the operating state of the safety program.

It may be preferable that the collection unit further collects an output value over the predetermined period, the output value being a value of an output signal selected previously in one or plural output signals output from the safety controller. The visualization unit displays the output value collected over the predetermined period in parallel with an output value calculated by the reproduction of the safety program.

It may be preferable that the safety system further includes a first setting support unit configured to extract an input signal used in a command associated with a safety function included in the safety program, and to set an input signal becoming a collection target of the collection unit according to selection of the extracted input signal.

It may be preferable that the first setting support unit includes: a unit configured to display a list of input signals constructed with at least a part of the extracted input signal together with an object receiving the selection; and a unit configured to set the input signal corresponding to the selected object to the collection target.

It may be preferable that the safety system further includes a second setting support unit configured to extract at least one of the input and output signals used in the command associated with the safety function included in the safety program, and to set a collection condition according to selection of a result of the extraction.

It may be preferable that the collection unit starts generation of the input value over the predetermined period when a predetermined collection condition is established.

It may be preferable that the collection unit starts generation of the input value over the predetermined period when a predetermined collection condition is established, the input value including an input value before a point of time the collection condition is established.

It may be preferable that the visualization unit displays only a part associated with the input value collected over the predetermined period in the safety program.

It may be preferable that the safety controller includes a safety input unit configured to receive an input signal, the safety input unit includes an input processor configured to decide the input value dealt with by the safety controller according to a rule defined previously from plural values indicated by one or plural input signals, and the collection unit also collects a value, which is used to decide the input signal with the input processor of the safety input unit.

It may be preferable that the collection unit is implemented in a control device connected to the safety controller.

According to another aspect of the present invention, a program executed with a computer in a safety system including a safety controller that executes a safety program, the program causing the computer to perform: acquiring a collection result of an input value over a predetermined period, the input value being a value of an input signal selected previously in one or plural input signals input to the safety controller; and reproducing a behavior of the safety program over the predetermined period based on the input value collected over the predetermined period, and expressing visually an operating state of the safety program at an appointed point of time in the predetermined period.

According to still another aspect of the present invention, a method performed in a safety system including a safety controller that executes a safety program, the method includes: collecting an input value over a predetermined period, the input value being a value of an input signal selected previously in one or plural input signals input to the safety controller; and reproducing a behavior of the safety program over the predetermined period based on the input value collected over the predetermined period, and expressing visually an operating state of the safety program at an appointed point of time in the predetermined period.

According to the aspects, the safety component can properly be maintained after the introduction.

BRIEF DESCRIPTION OF THE DRAWINGS

FIG. 4 is a view illustrating an example of trace data collected by a collection function of an embodiment;

FIG. 5 is a view illustrating another example of the trace data collected by the collection function of an embodiment;

FIGS. 8A and 8B are schematic diagrams illustrating an operation example of a visualization function of the safety system of an embodiment;

FIG. 14 is a schematic diagram illustrating an example of the user interface screen on which the collecting target and collecting condition of the trace data provided by the safety system of an embodiment, are set;

FIG. 15 is a schematic diagram illustrating trace data collecting processing by the collection function of an embodiment.

DETAILED DESCRIPTION

Figure 1:
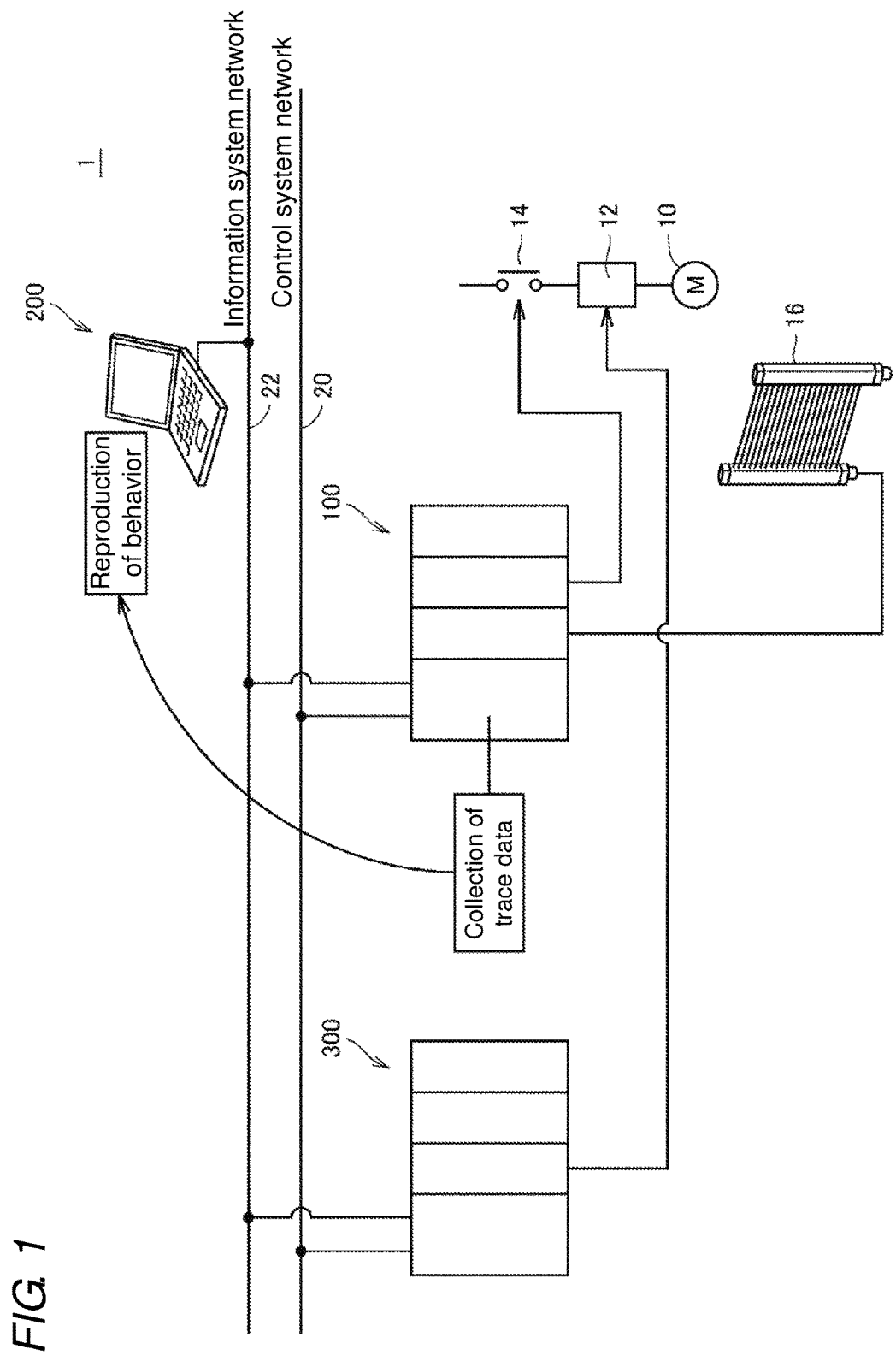
FIG. 1 is a schematic diagram illustrating an example of a configuration of a safety system according to an embodiment.

Hereinafter, an embodiment of the present invention will be described in detail with reference to the drawings. In the following drawings, the identical or equivalent component is designated by the identical reference numeral, and the repetitive description is omitted.

<A. Configuration of Safety System>

A configuration of a safety system 1 of an embodiment will be described below. FIG. 1 is a schematic diagram illustrating an example of the configuration of the safety system 1.

Referring to FIG. 1, the safety system 1 mainly includes a control device 300 that controls a facility and a machine and a safety controller 100.

Typically the control device 300 is constructed with a PLC (Programmable Logic Controller). The control device 300 executes a predetermined user program with respect to input data acquired from a control target, and issues an instruction to the control target according to output data calculated by the execution of the user program. A motor 10 and a driver 12 driving the motor 10 can be cited as an example of the control target in FIG. 1. When a certain driving start condition is established according to the user program, the control device 300 outputs a driving instruction to the driver 12 to rotate the motor 10. When a certain driving stop condition is established, the control device 300 stops the output of the driving instruction to the driver 12 to stop the rotation of the motor 10.

In addition to the control of the control target by the control device 300, typically the safety controller 100 is disposed to ensure safety of a worker associated with the control target. The safety controller 100 performs safety operation when a predetermined condition (safety condition), which is associated with a signal input from a safety input component (such as a safety sensor, a safety door switch, a safety limit switch, a push-button switch for emergency stop, and a safety switch), is established.

In the example of FIG. 1, a safety relay 14 is disposed on a power supply line to the driver 12. It is assumed that a dangerous area is set around a device driven with the motor 10, and that a safety sensor 16 is disposed on an entering passage to the dangerous area. When the worker enters the dangerous area, the safety sensor 16 detects the entry of the worker. The safety controller 100 issues an instruction to the safety relay 14 in response to a detection signal from the safety sensor 16. When the safety relay 14 operates in response to the instruction from the safety controller 100, the supply of the power driving the motor 10 to the driver 12 is cut off, and the motor 10 is forcedly stopped. The forced stop of the motor 10 can ensure the safety of the worker who enters the dangerous area.

In the configuration example of FIG. 1, the safety controller 100 and the control device 300 are connected to each other through a control system network 20, and can exchange internally-held data with each other. The safety controller 100 and the control device 300 are connected to a support device 200 through an information system network 22.

The support device 200 provides functions of developing the program executed with the safety controller 100 or control device 300, checking an execution state of the program, and changing the program.

\<B. Device Configuration\>

A device configuration of each device constituting the safety system 1 of an embodiment will be described below.

(b1: Safety Controller)

Figure 2:
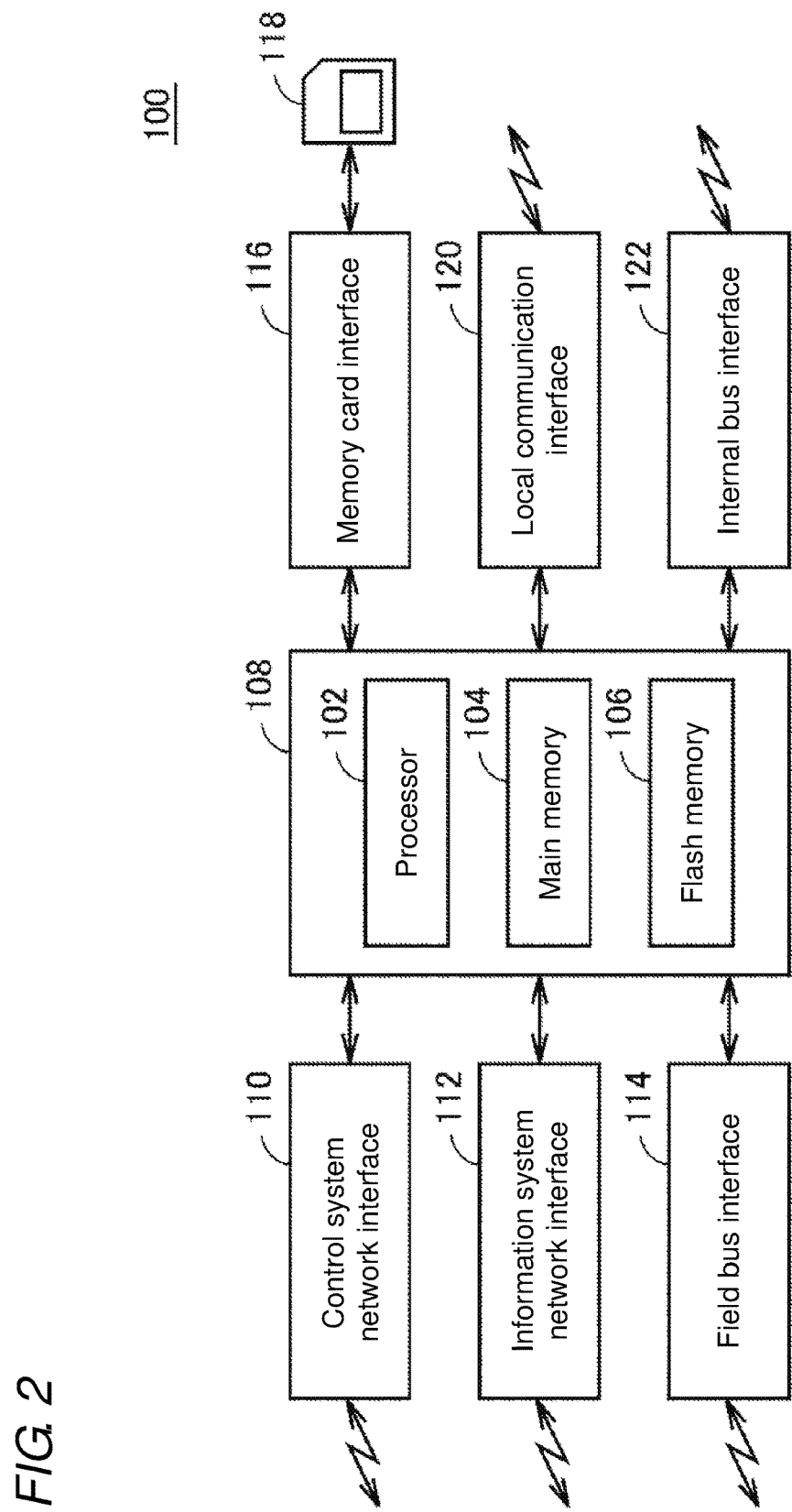
FIG. 2 is a schematic diagram illustrating an example of a device configuration of a safety controller of an embodiment.

FIG. 2 is a schematic diagram illustrating an example of the device configuration of the safety controller 100 of an embodiment. Referring to FIG. 2, the safety controller 100 includes an arithmetic processor 108 and various interfaces. The arithmetic processor 108 includes a processor 102, a main memory 104, and a flash memory 106.

In the arithmetic processor 108, the processor 102 expands and executes a system program, a safety program, and the like, which are stored in the flash memory 106, into the main memory 104, thereby achieving functional safety according to the control target.

As used herein, the "safety program" means a program, which operates the control target according to a predetermined condition (safety condition) so as to keep the control target safe, and means a command group defining processing of the safety controller. More specifically, the safety program includes a combination of commands deciding a value of one or plural output signals with respect to one or plural input signals.

Any safety program may be executed as long as the safety program defines the processing of the safety controller. That is, the safety program may exist as one or plural source codes, as one or plural object codes, or may be a form (execute form) executable with a processor of the safety controller.

The safety controller 100 includes a control system network interface 110, an information system network interface 112, a field bus interface 114, a memory card interface 116, a local communication interface 120, and an internal bus interface 122 as an interface.

The control system network interface 110 intermediates communication with another device through the control system network 20. Preferably a network protocol, such as EtherCAT (registered trademark), which guarantees punctuality, is applied to the control system network 20.

The information system network interface 112 intermediates communication with another device through the information system network 22. Preferably a network protocol, such as EtherNet/IP (registered trademark), which guarantees punctuality, is applied to the information system network 22.

The field bus interface 114 mediates communication with an input/output unit connected through a field bus (not illustrated). For example, EtherCAT (registered trademark), EtherNet/IP (registered trademark), DeviceNet (registered trademark), and CompoNet (registered trademark), which guarantee punctuality, are preferably applied to the field bus.

The memory card interface 116 is configured such that a memory card 118 is insertable, and the memory card interface 116 reads and writes data from and in the memory card 118.

The local communication interface 120 is directly connected to the support device 200 or another device. For example, a USB (Universal Serial Bus) is applied to the local communication interface 120.

The internal bus interface 122 mediates communication with the input/output unit, which is directly inserted in the safety controller 100 through an internal bus.

(b2: Control Device)

Because the control device 300 of an embodiment has the same device configuration as the safety controller 100 in FIG. 2, the detailed description is not repeated. Reduplication of the processor and the safety module are adopted in the safety controller 100. However, generally the reduplication of the processor and the safety module are not adopted in the control device 300. In the control device 300, not the safety program but the user program is executed.

(b3: Support Device)

Typically the support device 200 of an embodiment is implemented by execution of a support program on a general-purpose computer.

Figure 3:
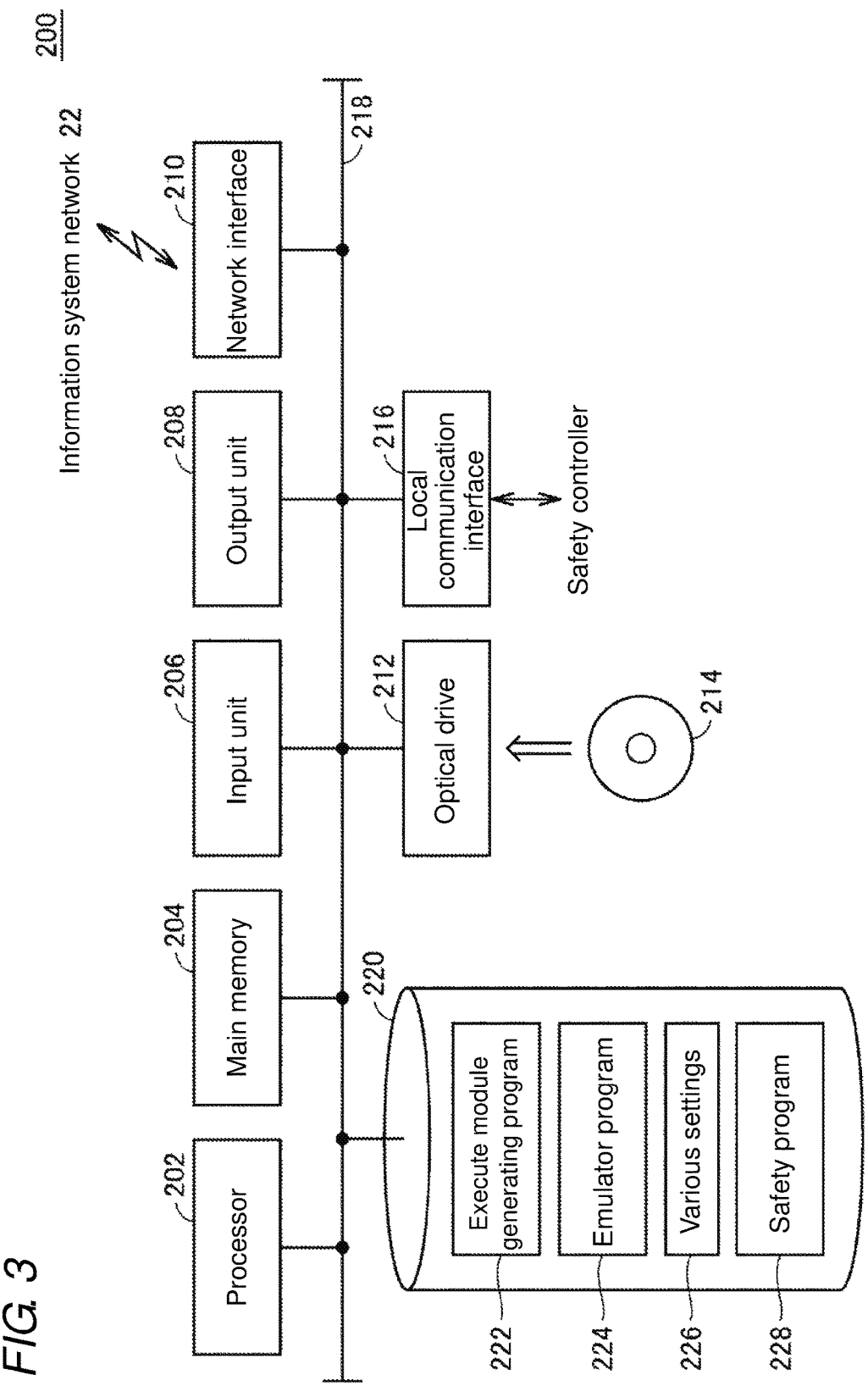
FIG. 3 is a schematic diagram illustrating an example of a device configuration of a support device of an embodiment.

FIG. 3 is a schematic diagram illustrating an example of the device configuration of the support device 200 of an embodiment. Referring to FIG. 3, the support device 200 includes a processor 202 that executes an Operating System (OS) and various programs (to be described later), a main memory 204 that provides a work area in which data necessary for the processor 202 to execute the program is stored, an input unit 206, such as a keyboard and a mouse, which receives a user's manipulation, an output unit 208, such as a display, various indicators, and a printer, which outputs a processing result, an information system network interface 210 connected to the information system network, an optical drive 212, a local communication interface 216 that conducts communication with the safety controller 100, and an auxiliary storage device 220 as a main component. These components are connected to one another so as to be able to conduct data communication with one another through an internal bus 218.

The support device 200 includes the optical drive 212, reads various programs from a computer-readable recording medium 214 of an optical recording medium (such as DVD (Digital Versatile Disc)) in which a computer-readable program is non-transiently stored, and installs the various programs in the auxiliary storage device 220.

The various programs executed with the support device 200 may be installed through the computer-readable recording medium 214 or may be installed by downloading from a server device on a network. Sometimes a program associated with evaluation of functional safety of an embodiment is implemented using a part of a module provided by the OS.

For example, the auxiliary storage device 220 is constructed with an HDD (Hard Disk Drive) or an SSD (Flash Solid State Drive). A program executed with the processor 202 is stored in the auxiliary storage device 220. Specifically, the auxiliary storage device 220 includes an execute module generating program 222 generating a code (execute code) executable with the processor 202 from a safety program 228 (source program) and an emulator program 224 reproducing the execution of the safety program 228 based on trace data (to be described later) as a program that provides the later-described processing. The function and processing provided by the programs will be described later. Various settings 226 associated with the safety program 228 are stored in the auxiliary storage device 220.

In FIG. 3, the functions associated with the support device 200 of an embodiment are implemented by the execution of the support program on the general-purpose computer. Alternatively, a whole or some of the functions may be implemented as a hard wired circuit. For example, the function provided by the various programs executed with the processor 202 may be implemented using an ASIC (Application Specific Integrated Circuit) or an FPGA (Field-Programmable Gate Array).

\<C. Outline\>

An outline of the function provided with the safety system 1 of an embodiment will be described below. Referring to FIG. 1 again, the safety system 1 includes the safety controller 100 that executes the safety program. A time-series change of data processed with the safety controller 100 is collected, and an execution state of the safety program is evaluated and verified ex post facto based on the collected data.

Hereinafter, the time-series change of data processed with the safety controller 100 is also referred to as "trace data". Typically the "trace data" that is of a time-series data group includes all or a part of a value (input value) of the input signal input to the safety controller 100, a variable value used in the safety program executed with the safety controller 100, and a value (output value) of the output signal output from the safety controller 100. Additionally, the trace data may include a state value indicating an internal state or a system state of the safety controller 100. The trace data can include all pieces of data processable with the safety controller 100.

Thus, the collection function of collecting the trace data of the safety controller 100 is implemented in the safety system 1 of an embodiment. The collection function includes a function of collecting the input value, which is the value of the input signal previously selected in one or plural input signals input to the safety controller 100, over a predetermined period. The collection function may also include a function of collecting the output value, which is the value of the output signal previously selected in one or plural output signals output from the safety controller 100, over the predetermined period.

The support device 200 performs processing of reproducing the safety program based on the trace data collected from the safety controller 100. In the reproduction processing, based on the collected trace data, the behavior of the safety program is reproduced over the predetermined period, and the operating state of the safety program is visually expressed at the appointed point of time in the predetermined period. The provision of the visual function (visualization function) can facilitate investigation of a cause when some sort of safety operation is performed, and properly maintain the safety component after the introduction.

More details of the collection function and visualization function will be described below. Typically these functions may be implemented by an emulator program 224 (see FIG. 3) installed in the support device 200.

<D. Collection Function>

The detailed content of the collection function of collecting the trace data of an embodiment will be described below.

(d1: Trace Data)

An example of the trace data collected by the collection function of an embodiment will be described below. FIG. 4 is a view illustrating an example of trace data 40 collected by the collection function of an embodiment. In FIG. 4, for convenience of description, trace data 40 is expressed in a tabular form. However, the trace data 40 is not limited to the tabular form, and any data structure may be adopted to express the trace data 40.

A value of each of a corresponding input value group 50 and a corresponding output value group 60 is stored in the trace data 40 of FIG. 4 while associated with time 42 in which the trace data 40 is sampled. The trace data 40 is associated with the safety program operating both or one of two safety relays according to input signals from three safety components (a push-button switch for emergency stop, a safety door switch, and a safety sensor).

The input value group 50 includes a reset signal 51 releasing a safety operating state, input signals 52, 53 from the push-button switch for emergency stop, input signals 54, 55 from the safety door switch, and input signals 56, 57 from the safety sensor (in this case, a safety light curtain). It is assumed that the input signal from the safety component is reduplicated, and that the two input signals are provided from the identical safety component to the safety controller 100.

The output value group 60 includes output signals 61, 62 to one of the safety relays and output signals 63, 64 to the other safety relay. The input value group 50 includes feedback signals 58, 59 indicating operating states of the safety relays.

The input value, which is the value of the input signal previously selected in one or plural input signals input to the safety controller 100, is collected over the predetermined period as the trace data 40. The output value, which is the value of the output signal previously selected in one or plural output signals output from the safety controller 100, is also collected over the predetermined period.

As a technique to compress an information amount of the trace data 40, the input value may be output as the trace data 40 only when any change is generated in the input value or output value.

FIG. 5 is a view illustrating another example of the trace data 40 collected by the collection function of an embodiment. FIG. 5 illustrates an example of a result acquired by a method for updating the trace data 40 on a condition that the input value included in the input value group 50 changes (hereinafter, also referred to as a "collection condition" or a "trigger condition"). In the example of FIG. 5, the case that any one of the input values changes from "0" (False) to "1" (True) (rising) and the case that any one of the input value changes from "1" (True) to "0" (False) (falling) are used as the collection condition. Only one of the rising and the falling may be used as the collection condition.

When the trace data 40 is generated, the data amount can be reduced, and the trace data can be collected for a longer period in the case of the use of the identical storage area.

In the example of FIG. 5, the feedback signals 58, 59 are excluded from the trigger condition. Alternatively, the feedback signals 58, 59 may be included in the collection condition or the change of the output value included in the output value group 60 may be included in the collection condition.

FIG. 5 illustrates the example in which the digital input value ("0" value (off or False)/"1" value (on or True)) is collected. Alternatively, an analog input value may be collected. For example, a light reception amount of the safety light curtain may be included in the trace data 40. In this case, the case that the light reception amount is lowered below a predetermined threshold can be set to the collection condition.

(d2: Implementation of Collection Function)

Figure 6A:
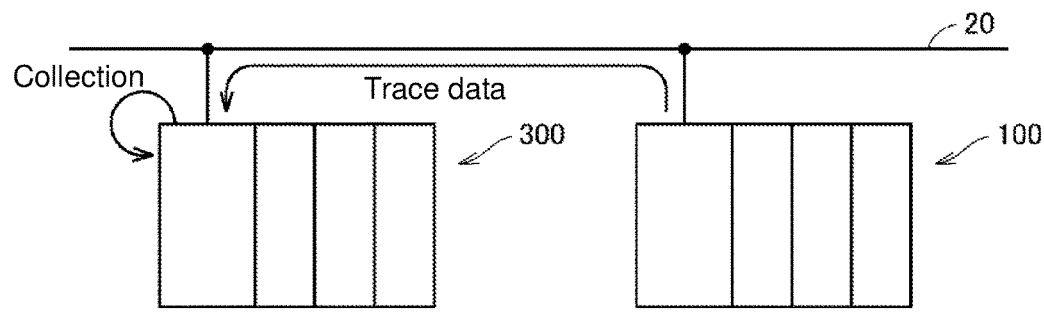
FIGS. 6A, 6B, and 6C are views illustrating an example of implementation of the collecting function of an embodiment.
Figure 6B:
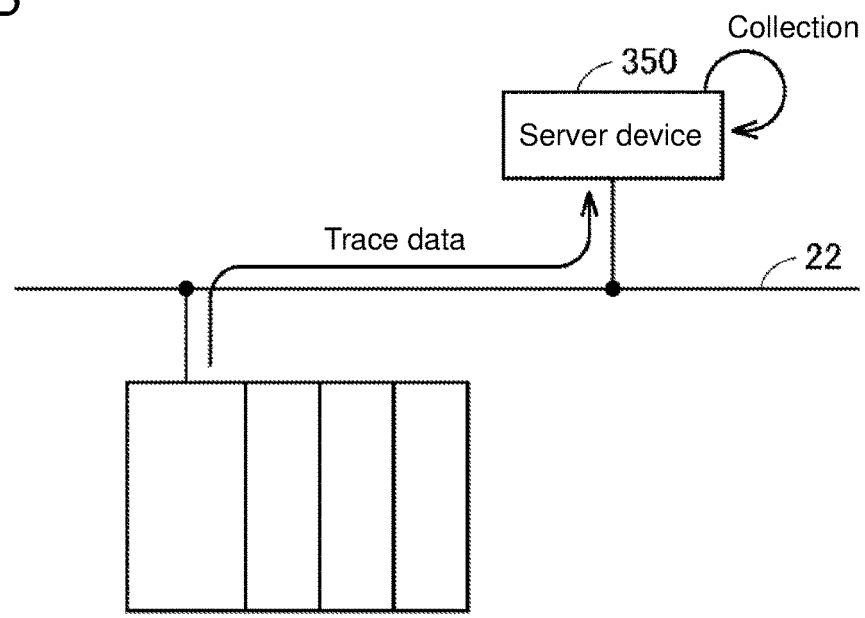

An example of implementation of the collection function of an embodiment will be described. FIGS. 6A to 6B are views illustrating an example of the implementation of the collecting function of an embodiment.

FIG. 6A illustrates an example in which the collection function of collecting the trace data of the safety controller 100 is implemented in the control device 300. That is, the collection function is implemented in the control device 300 connected to the safety controller 100. Preferably the safety controller 100 and the control device 300 are connected to each other through a network using the control system network 20 (network connection). Alternatively, the safety controller 100 and the control device 300 may be connected to each other through a bus (bus connection), or another communication method may be adopted.

The adoption of the implementation in FIG. 6A can collect the trace data without actually having any influence on the execution of the safety program in the safety controller 100. Even if implementation of a clock function in the safety controller 100 is restricted, the trace data in FIG. 4 or 5 can be collected by addition of time information to the trace data collected with the control device 300.

FIG. 6B illustrates an example in which the collection function of collecting the trace data of the safety controller 100 is implemented in a high-order server device 350. That is, the collection function is implemented in the high-order server device 350 connected to the safety controller 100 through the network. Preferably the safety controller 100 and the server device 350 are connected to each other through the network using the information system network 22.

The adoption of the implementation in FIG. 6B can collect the trace data without actually having any influence on the execution of the safety program in the safety controller 100. The pieces of trace data may be collected from plural safety controllers 100 using one server device 350, so that the trace data can efficiently be collected.

Figure 6C:
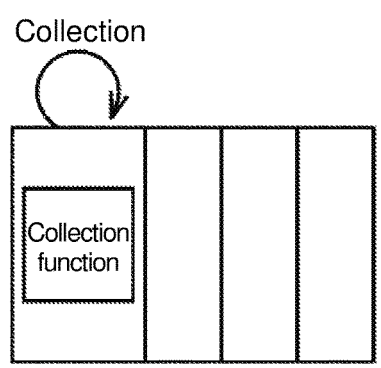

FIG. 6C illustrates an example in which the collection function of collecting the trace data is implemented in the safety controller 100 per se. The trace data is collected only with the safety controller 100 by the adoption of the implementation in FIG. 6C, so that the configuration of the safety system can be simplified.

The implementation in FIG. 6C and the implementation in FIG. 6A or 6B may be combined with each other. In such cases, for example, the safety controller 100 determines whether the predetermined collection condition is established in each control period. When it is determined that the collection condition is established, the trace data may be collected over the predetermined period based on time in which the collection condition is established, and the collected trace data may be transmitted to the control device 300 or the server device 350. That is, the safety controller 100 may be used as a kind of buffer, and the whole of the collected trace data may be stored in the external control device 300 or server device 350.

Thus, the collection function of collecting the trace data of an embodiment can be implemented in a proper device according to the configuration or scale of the safety system 1.

<E. Visualization Function>

The detailed content of the visualization function provided by the safety system 1 of an embodiment will be described below. In the visualization function, based on the collected trace data, the behavior of the safety program is reproduced over the predetermined period, and the operating state of the safety program is visually expressed at the appointed point of time.

(e1: Reproduction of Behavior and Visual Expression of Operating State)

Figure 7:
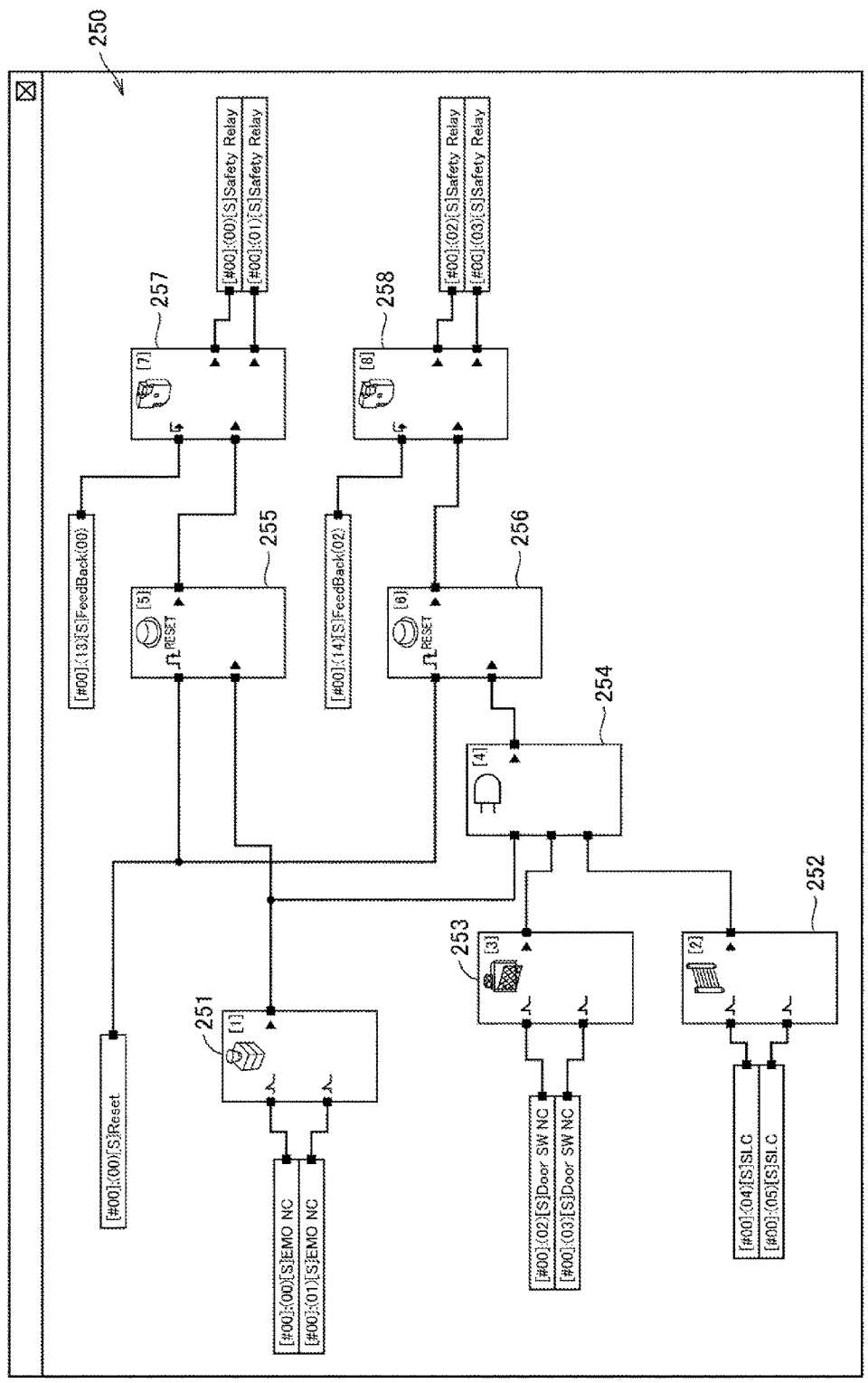
FIG. 7 is a view illustrating an example of a safety program executed in the safety system of an embodiment.

FIG. 7 is a view illustrating an example of the safety program executed in the safety system 1 of an embodiment. The visualization function of an embodiment includes a function of schematizing and displaying a combination of commands included in the safety program. Specifically, as illustrated in FIG. 7, a tag display 250 partially indicating the safety program is presented on a display of the support device 200.

By way of example, the tag display 250 includes a function block 251 that performs input processing of the push-button switch for emergency stop, a function block 252 that performs input processing of the safety sensor (in this case, the safety light curtain), and a function block 253 that performs input processing of the safety door switch. In the safety program, a command associated with the safety function is defined by one function block or a combination of plural function blocks.

An output of the function block 251 and the input value of a reset button are input to a function block 257 that performs processing of driving the safety relay through a function block 255 that performs input processing of a reset signal.

Outputs of the function blocks 251, 252, 253 are input to a function block 254 that performs an AND operation, and an output of the function block 254 and the input value of the reset button are input to a function block 258 that performs processing of driving the safety relay through a function block 256 that performs input processing of the reset signal.

FIG. 7 illustrates the tag display 250 as a schematized example. However, any schematization method may be adopted as long as the content of the safety program can be understood.

In the visualization function of an embodiment, based on the collected trace data, the behavior of the safety program is reproduced over the predetermined period, and the operating state of the safety program is visually expressed at the appointed point of time in the predetermined period.

Specifically, the input value at each time of the collected trace data is input to the previously-prepared safety program, and the output value is calculated at each time. The input value at each time is changed according to the collected trace data, and the output value at the corresponding time is sequentially calculated, which allows the behavior of the safety program to be reproduced over the predetermined period. A display mode of the tag display 250 in FIG. 7 is changed according to an operating state of the safety program at each time (that is, real values of the input value and output value at each time).

FIGS. 8A and 8B are schematic diagrams illustrating an operation example of the visualization function of the safety system 1 of an embodiment. As illustrated in FIGS. 8A and 8B, the visualization function of an embodiment includes a function of changing the display mode of a corresponding element (each function block or connecting line) included in the schematized display (tag display 250) according to at least one of the input value, the internal value calculated according to the input value, and the output value calculated according to the input value.

By way of example, FIG. 8A illustrates an operating state at time "0:00:00" of the trace data in FIG. 4 or 5, and FIG. 8B illustrates an operating state at time "0:00:38" of the trace data in FIG. 4 or 5.

In FIGS. 8A and 8B, the display control is performed so as to obtain the display mode in which a passage corresponding to "1" (True) indicated by one of the input value, the internal value, and the output value is different from a passage corresponding to the value indicating "0" (False).

In the operating state of FIG. 8A, an input signal from a certain safety input component changes temporarily from "1" (True) to "0" (False), and a cut-off instruction is issued to the safety relay. Then, when a user presses the reset button, the reset signal is provided to the function blocks 255, 256, and the internal value at which the output is provided to the function blocks 257, 258 changes from "0" (False) to "1" (True). Therefore, the safety relay is turned on again, and the operation of the facility or machine is restarted.

On the other hand, FIG. 8B illustrates the operating state immediately after the input signal from the safety sensor (in this case, the safety light curtain) changes from "1" (True) to "0" (False). When the safety sensor detects a certain object to change the output signal from "1" (True) to "0" (False), the internal value input to the function block 258 changes from "1" (True) to "0" (False), and the cut-off instruction is issued to the corresponding safety relay. That is, FIG. 8B illustrates the state in which only one of the safety relays performs the cut-off operation.

Thus, the operating state of the safety program is visually expressed at each time of the collected trace data. At this point, in addition to the tag display 250, a control module 260 may be displayed to arbitrarily set the visually-expressed time.

The control module 260 includes a reproduction button starting the reproduction of the execution of the safety program, a button stopping the reproduction of the execution of the safety program at any time, and a button setting forward or backward a clock displaying a target time in which the operating state is displayed. The user can manipulate the control module 260 to check the operating state of the safety program at any time.

Sometimes, depending on circumstances, it is necessary to examine details of operating information before and after a certain event is generated. In such cases, a function of temporarily stopping the reproduction at a predetermined time (setting of a brake point) or a function of executing the safety program in each one control period (step execution) may be prepared.

Figure 9:
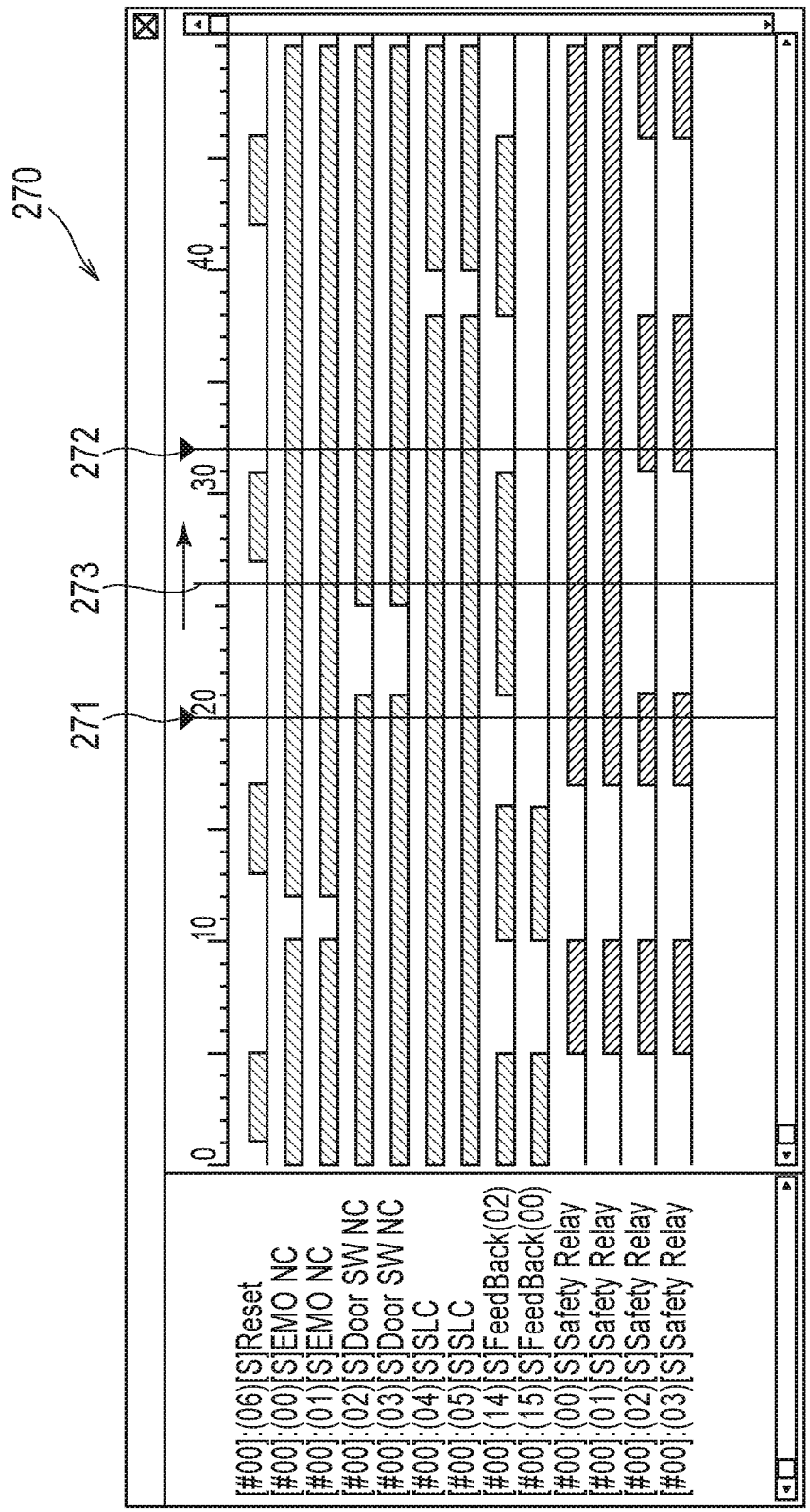
FIG. 9 is a timing chart illustrating an example of a temporal change in trace data.

FIG. 9 is a view illustrating an example of a timing chart 270 of a temporal change in trace data. FIG. 9 illustrates a temporal change of the collected trace data, and a section where the safety program is reproduced may arbitrarily be set on the timing chart 270. More specifically, the user can set a start point 271 and an end point 272 with respect to any position of the timing chart 270. When a start instruction is issued, the reproduction of the execution of the safety program is started with respect to the section from the start point 271 to the end point 272. At this point, a current position display bar 273 indicating a currently-reproduced time may also be displayed. The current position display bar 273 may be moved anywhere. In this case, the operating state at the time in which the current position display bar 273 is located can visually be expressed.

Plural start points 271 and plural end points 272 can be set. Not the end point 272 but the brake point temporarily stopping the operation may be set. The step execution may be performed on the timing chart 270.

Figure 10:
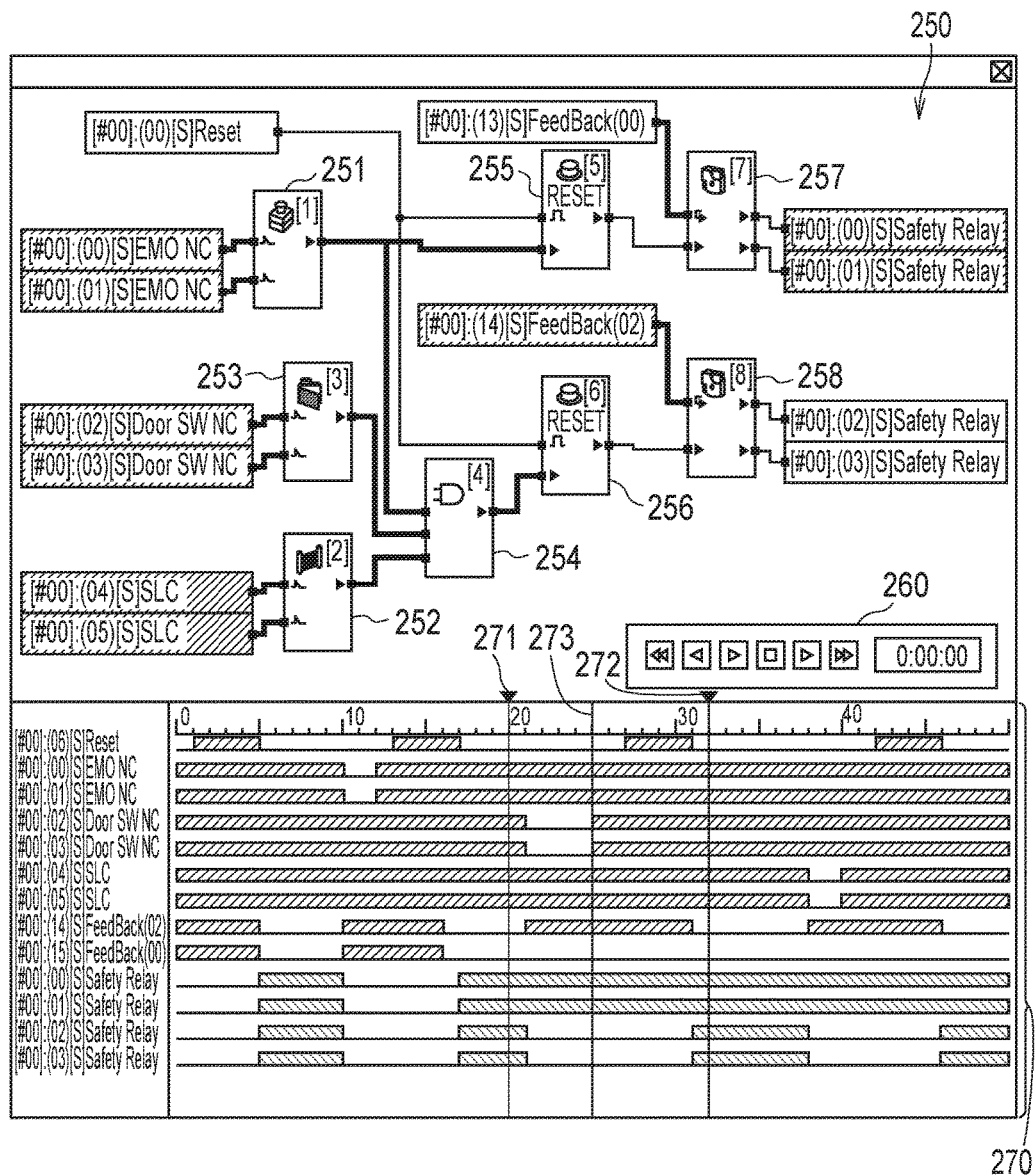
FIG. 10 is a schematic diagram illustrating an example of a user interface screen provided by the visualization function of the safety system of an embodiment.

The timing chart 270 in FIG. 9 may be displayed together with the tag display 250 in FIGS. 8A and 8B. FIG. 10 is a schematic diagram illustrating an example of a user interface screen provided by the visualization function of the safety system 1 of an embodiment. Referring to FIG. 10, a user interface screen integrally including the tag display 250 partially indicating the safety program, the control module 260, and the timing chart 270 may be presented to the user. Thus, the visualization unit of an embodiment may output the timing chart indicating the input value collected over the predetermined period together with the operating state of the safety program.

In the user interface screen, the operation of the safety program can be reproduced at any time or section in the control module 260 or timing chart 270, and the operating state can be checked at each time.

(e2: Associated Portion Display)

Usually the safety program includes logical operation expressions as many as monitoring targets. When the number of logical operation expressions included in the safety program increases, all the logical operation expressions are hardly displayed at once. At the same time, because all the input values are not the target collected as the trace data, only a portion associated with the safety program may be presented to the user when the execution of the safety program is reproduced by the visualization function of an embodiment.

Figure 11:
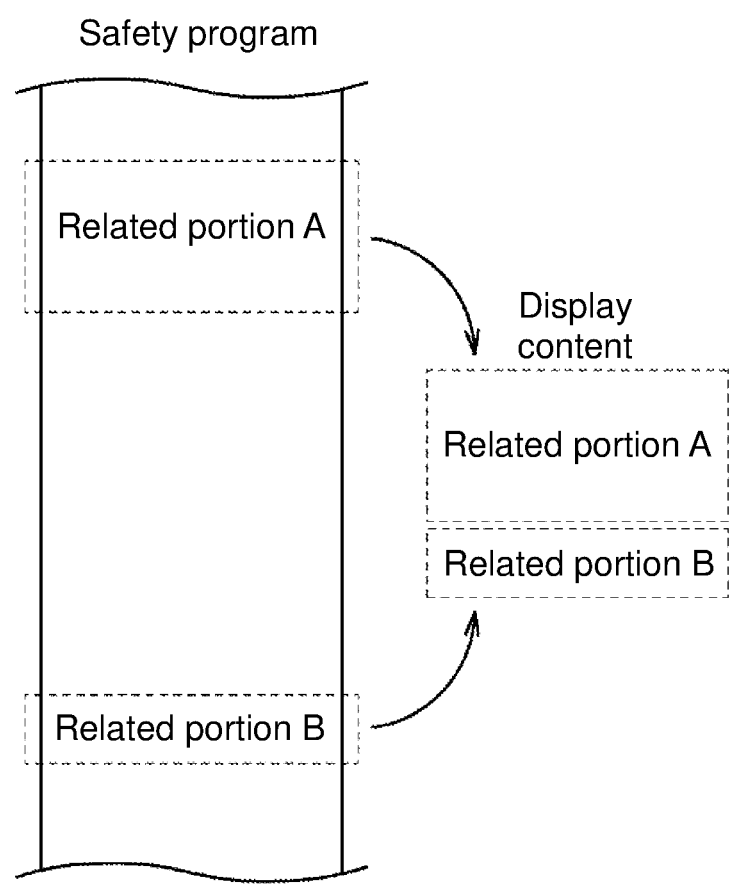
FIG. 11 is a conceptual view illustrating a display range by the visualization function of the safety system of an embodiment.

FIG. 11 is a conceptual view illustrating a display range by the visualization function of the safety system 1 of an embodiment. Referring to FIG. 11, for example, it is assumed that two portions including the logical operation expressions in each of which the collected trace data is used exist in the safety program (an associated portion A and an associated portion B). When the execution of the safety program is reproduced by the visualization function, only the associated portions A and B may be presented to the user. FIG. 11 illustrates an example in which the two associated portions exist. In this case, the two extracted associated portions may be presented to the user while coupled together. For one associated portion, only the associated portion may be presented to the user. Thus, the visualization unit of an embodiment may display only the portion associated with the input value collected over the predetermined period in the safety program.

The performance of the processing in FIG. 11 of displaying only the associated portion can efficiently check the reproduction result of the safety program.

(e3: Comparison to Expected Output Value)

As described above, the trace data can include the output value that is of the output signal previously selected in one or plural output signals output from the safety controller 100. Generally, only the input value of the associated input signal is enough to reproduce the execution of the safety program.

However, possibly the output value acquired by the reproduction of the execution of the safety program (hereinafter, also referred to as an "expected output value") does not agree with the actually-collected output value for some reason. Additionally, it is preferable to be able to evaluate a difference between the output value (that can also be included in the "expected output value"), which is previously assumed at the design stage by the operation of the safety program, and the actually-collected output value.

The output value collected as the trace data over the predetermined period may be displayed in parallel with the output value calculated by the reproduction of the safety program as a function of maintaining the performance of the safety component.

Figure 12:
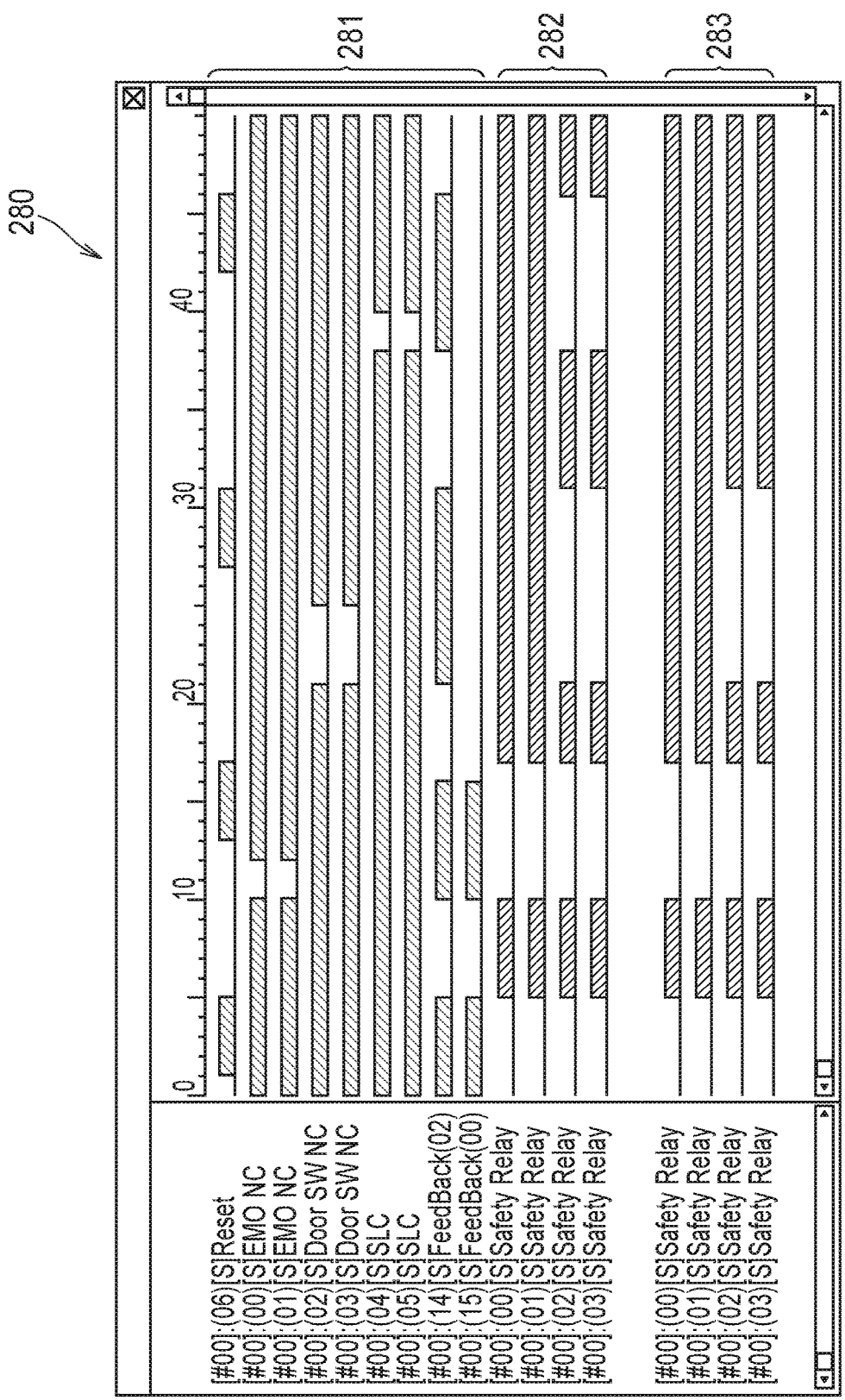
FIG. 12 is a schematic diagram illustrating an example of the user interface screen on which an output value and an expected output value, which are included in the trace data, are displayed.

FIG. 12 is a schematic diagram illustrating an example of the user interface screen on which the output value and expected output value, which are included in the trace data, are displayed. Referring to FIG. 12, for example, a timing chart 280 indicating the temporal change of the trace data includes a timing chart group 281 associated with the input value, a timing chart group 282 associated with the output value, and a timing chart group 283 associated with the expected output value.

The timing chart group 282 reflects the temporal change of the output value included in the collected trace data, and the timing chart group 283 reflects the temporal change of the output value (that is, the expected output value) calculated based on the temporal change of the input value included in the collected trace data.

The temporal change of the actually-collected output value and the temporal change of the calculated expected output value are displayed in contrast. Therefore, the user can understand which one of the output values varies at each time, and can easily find the cause of the malfunction.

The mode in which the output value collected as the trace data over the predetermined period and the output value calculated by the reproduction of the safety program are displayed in parallel with each other is not limited to the timing chart in FIG. 12, and a table in which both the output values are disposed in parallel with each other may be displayed.

<F. Collection Target and Collection Condition of Trace Data>

An example of a method for setting the collection target and collection condition, which are included in the trace data, in the safety system 1 of an embodiment will be described below.

Many input values, internal values, and output values are associated with the safety program executed with the safety controller 100, and possibly it takes a lot of time and labor to select the input value, internal value, and output value as the collection target of the trace data. Therefore, it is preferable to implement the following setting support function.

Figure 13:
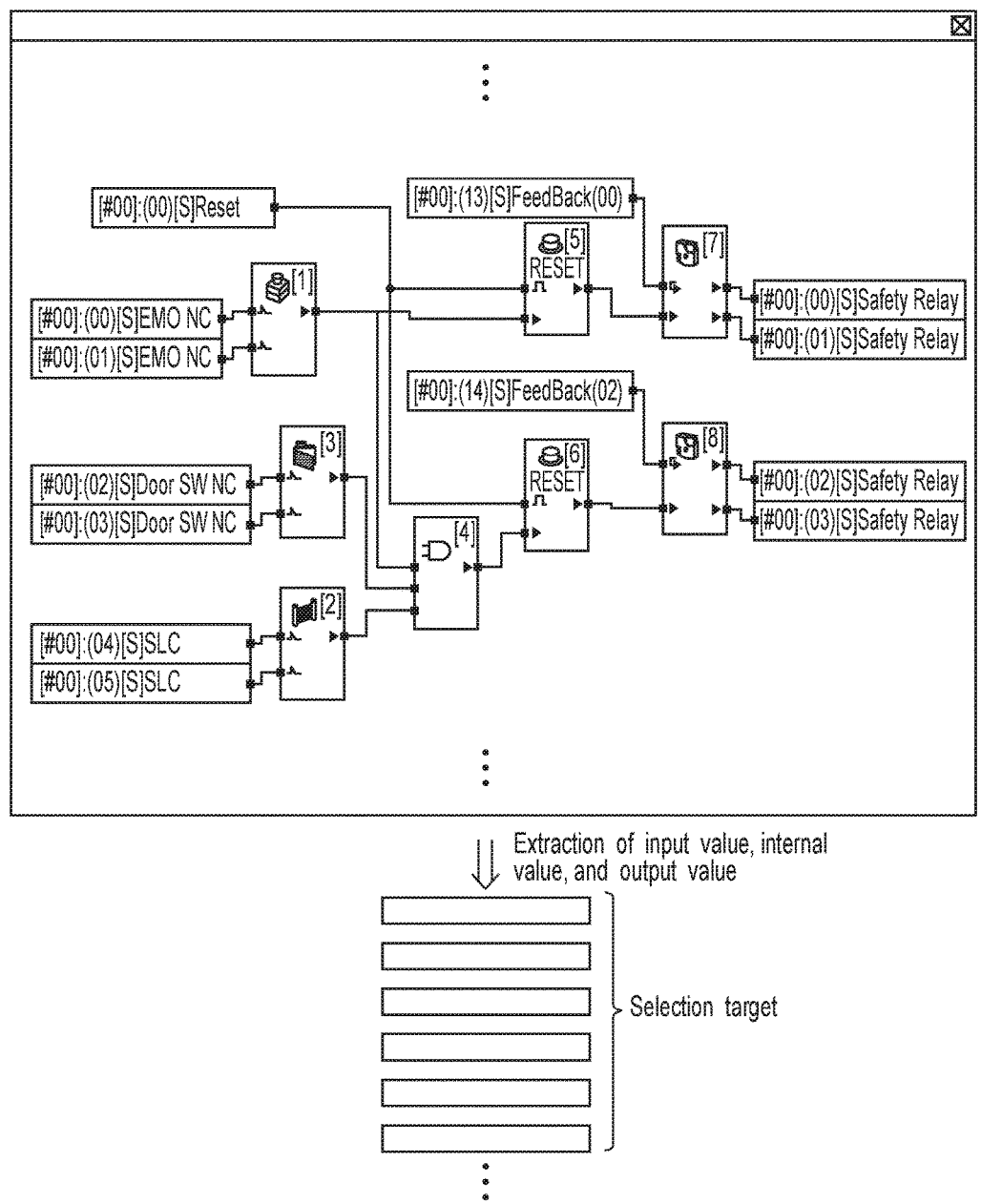
FIG. 13 is a schematic diagram illustrating a collection-target selection supporting method provided by the safety system of an embodiment.

FIG. 13 is a schematic diagram illustrating a method for supporting the selection of the collection target provided by the safety system 1 of an embodiment. FIG. 14 is a schematic diagram illustrating an example of the user interface screen on which the collection target and collection condition of the trace data provided by the safety system 1 of an embodiment are set.

As illustrated in FIG. 13, in the support function of an embodiment, the input value, internal value, and output value, which are included in the previously-prepared safety program, are extracted by analysis of the safety program. The extracted input value, internal value, and output value become the targets collected as the trace data.

It is assumed that the trace data mainly includes the selected one or plural input values. That is, in the support function of an embodiment, the input signal used in the command associated with the safety function of the function block included in the safety program is extracted, and the input signal becoming the collection target of the collection function is set according to the selection of the extracted input signal. In addition to the input value, similarly the internal value and the output value can be selected as the collection target of the collection function.

An interface screen 290 of FIG. 14 supports the selection of the collection target. The interface screen 290 in FIG. 14 includes an area 291 where the collection target is selected and an area 294 where the collection condition is set.

A list of items 292 of the input signals (input values) extracted from the safety program is displayed in the area 291, and a list of sub-items 293 associated with the output signal (output value) or the internal value (not illustrated) is displayed while associated with each of the items 292 of the input value. The association between the item 292 of the input value and the sub-item 293 of the output value or internal value is extracted from analysis result of the target safety program.

The function (interface screen 290) of displaying the list of input signals (the items 292 of the input values) constructed with at least a part of the extracted input signal together with an object receiving the selection (a checkbox included in the item 292) is included as illustrated in FIG. 14. The input signal (the item 292 of the input value) corresponding to the selected object (selected checkbox) is set to the collection target.

The area 294 includes a checkbox group 295 in which the rising condition (change of 0→1) is set to the collection condition while associated with the input value, internal value, and output value, which are selectable as the collection target, and a checkbox group 295 in which the falling condition (change of 1→0) is set to the collection condition. The user can select any checkbox as the condition that starts the collection of the trace data.

When the appointed change is generated in the target value by the setting of the collection condition as illustrated in FIG. 14, the value of the selected collection target is collected as the trace data. Thus, in the support function of an embodiment, at least one of the input signal and output signal, which are used in the command associated with the safety function of the function block included in the safety program is extracted, and the collection condition is set according to the selection of the extraction result.

The screen user interface providing the support function of an embodiment is not limited to one in FIG. 14, and any user interface may be applied. For example, selection schemes such as a pull-down menu or a radio button may be adopted instead of or in addition to the checkbox in FIG. 14. A direct input scheme, a scheme in which a certain threshold is appointed with a dial or a slider, and a scheme in which the threshold is appointed on a graph may be adopted in the case that the threshold is set.

When a change of a certain value is set to the collection condition, and when the collection condition is established, the generation of the input value (the collection of the trace data) is started over the predetermined period. However, preferably a period before and after the time in which the collection condition is established is set to the collection target of the trace data.

FIG. 15 is a schematic diagram illustrating the trace data collecting processing by the collection function of an embodiment. Referring to FIG. 15, when the collection condition is established as basic operation of the collection function, the value of the collection target is collected over the predetermined period. In the example of FIG. 15, assuming that the collection condition is established at time t1, the collection of the trace data is started with the time t1 as a start point.

Alternatively, even if the collection condition is not established, the value of the collection target may be buffered only for a predetermined time. When the collection condition is established, the value of the collection target is collected over the predetermined period based on the time in which the collection condition is established.

In the example of FIG. 15, assuming that the collection condition is established at time t1, the collection of the trace data is started with time t0 before the time t1 as the start point. Thus, in the collection function of an embodiment, when the predetermined collection condition is established, the input value (trace data) including the input value before a point of time in which the collection condition is established is generated over the predetermined period. The adoption of the collection method can surely collect the last and next temporal change necessary for the analysis of the event of interest.

How long it takes to collect the data since the time in which the collection condition is established (that is, a time width between the time t1 and the time t0 in FIG. 15) may previously be set to a default value, or arbitrarily be set by the user.

<G. Local Register of Safety Input Component>

Generally, a response time of the safety input component is sufficiently shorter than the control period of the safety controller 100. Sometimes the safety input unit inserted in the safety controller 100 decides a representative value on a safety side from the temporal change of the detected value as the input value of the safety controller 100. In such cases, preferably not only the input value input to the safety controller 100 but also the detection value detected with the safety input component are included in the trace data. An example in which a value of the input signal detected with the safety input unit is collected with higher accuracy will be described below.

Figure 16:
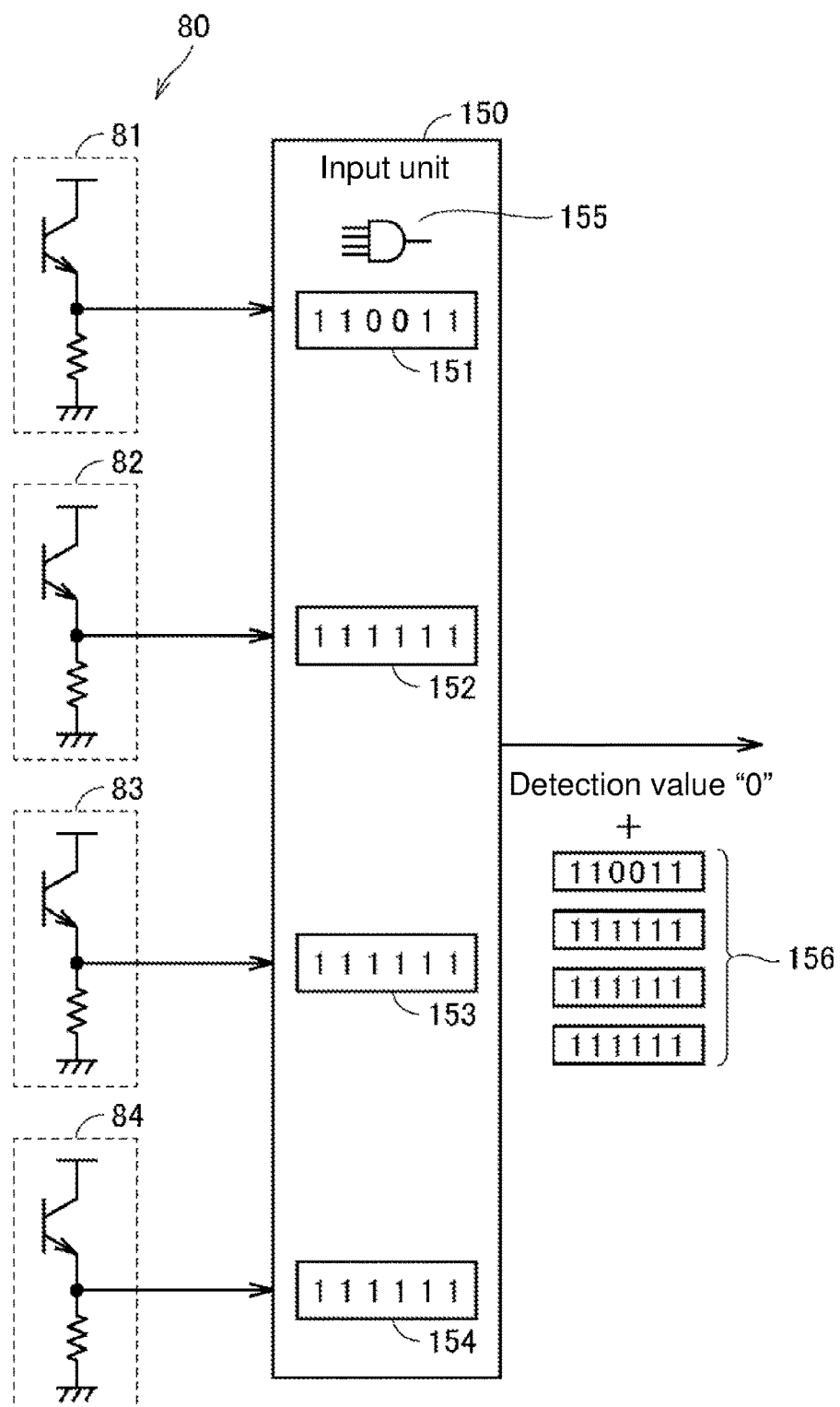
FIG. 16 is a schematic diagram illustrating a method for collecting an input value with respect to a safety input unit by the collection function of an embodiment.

FIG. 16 is a schematic diagram illustrating a method for collecting the input value with respect to the safety input unit by the collection function of an embodiment. Referring to FIG. 16, a safety light curtain 80 that is of an example of the safety sensor includes four light reception sensors 81, 82, 83, 84. The safety controller 100 includes a safety input unit 150 that receives the signal from the safety light curtain 80. The signal detected with each light reception sensor is provided to the safety input unit 150. The safety input unit 150 receives the signals from the safety light curtain 80, and outputs a logical product of the signals to the safety controller 100 as a detection result.

The safety input unit 150 includes local registers 151, 152, 153, 154 in which the values of the signals from the safety light curtain 80 are stored. Each of the local registers 151, 152, 153, 154 includes a circuit that detects a value in a period earlier than a period in which the safety input unit 150 outputs the detection result. The logical products of the whole values stored in the local registers 151, 152, 153, 154 is operated, and an operation result of the logical products is output as a detection result. In the example of FIG. 16, "0" is output as the detection result when "0" is included in one of the local registers 151, 152, 153, 154. The safety input unit 150 includes an input processor 155 that decides the input value dealt with by the safety controller 100 from the plural values indicated by one or plural input signals according to a predetermined rule. A logic for deciding the input value from the plural values is not limited to the logical product, and logics such as logical OR, exclusive OR, and majority decision or a combination of plural logics may be adopted.

In addition to the decided detection value, the data streams 156 stored in the local registers 151, 152, 153, 154 are transmitted from the safety input unit 150 to the safety controller 100. The data stream 156 is collected as the target of the trace data. That is, in the collection function of an embodiment, the input processor 155 of the safety input unit 150 also collects the value used to decide the input signal. The collection of the value of the local register can also detect the malfunction of the safety sensor.

<H. Whole Processing Procedure>

A processing procedure during use of the collection function and visualization function provided by the safety system 1 of an embodiment will be described below.

Figure 17:
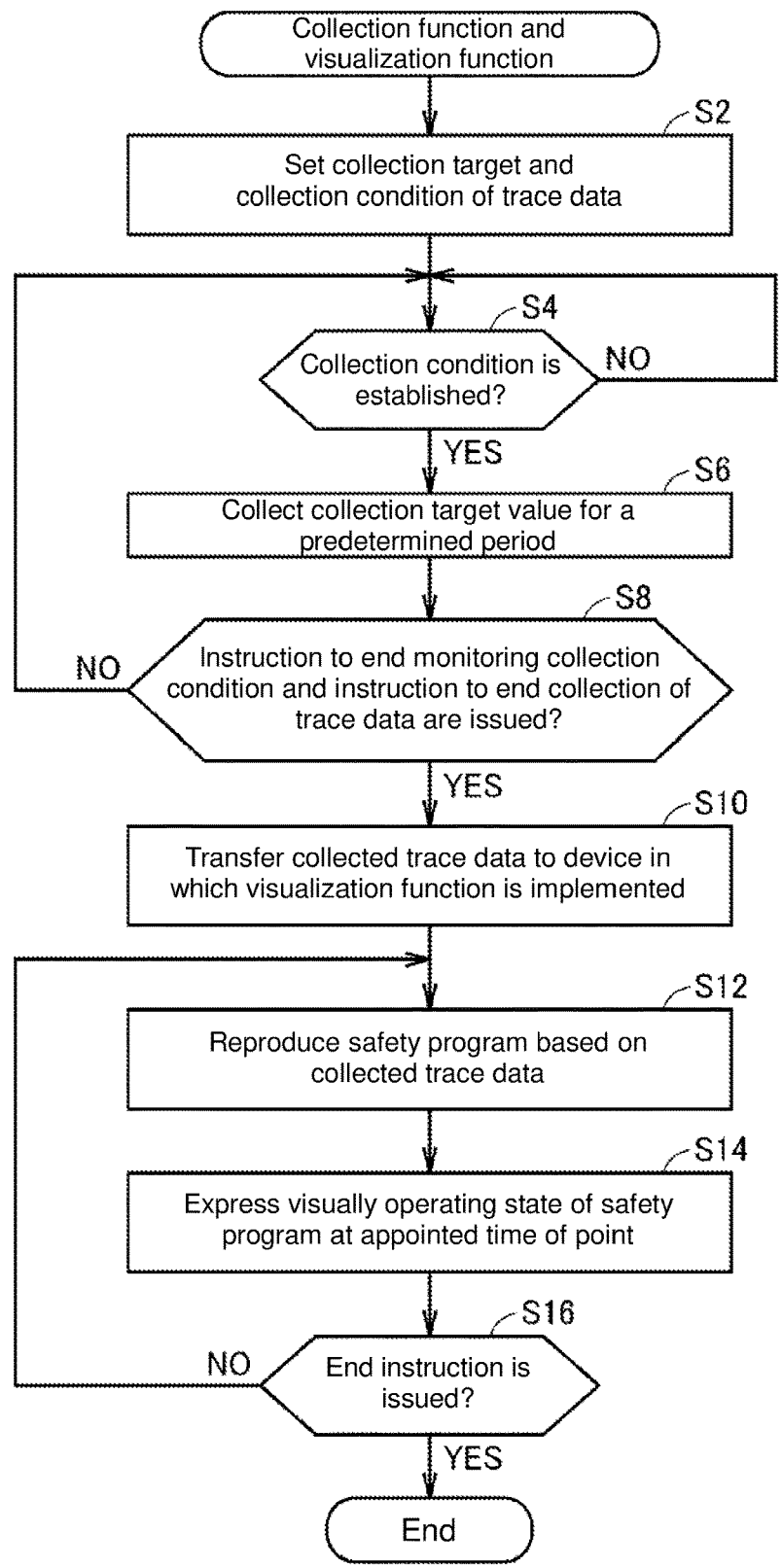
FIG. 17 is a flowchart illustrating a processing procedure during use of the collection function and visualization function provided by the safety system of an embodiment.

FIG. 17 is a flowchart illustrating a processing procedure during the use of the collection function and visualization function provided by the safety system 1 of an embodiment. Referring to FIG. 17, the collection target and collection condition of the trace data are set (step S2). Specifically, the user manipulates the interface screen 290 in FIG. 14 to set the collection target and the collection condition. The setting information is transferred to the device in which the collection function is implemented.

Whether the collection condition is established in the device in which the collection function is implemented is determined (step S4). When the collection condition is established (YES in step S4), the value of the collection target is collected over the predetermined period (step S6). That is, the trace data is collected. The monitoring of the establishment of the collection condition and the collection of the trace data are repeated until an end instruction is provided (NO in step S8). The collection of the trace data may be ended when a predetermined period elapses (time is up), or explicitly ended by the user. Alternatively, the collection of the trace data may be ended in response to any signal from the control target.

When the instruction to end the collection of the trace data is issued (YES in step S8), the collected trace data is transferred to the device in which the visualization function is implemented (step S10), the safety program based on the collected trace data is reproduced using the visualization function according to the user's manipulation (step S12), and the operating state of the safety program is visually expressed at the appointed point of time (step S14). These pieces of processing are repeated until an end instruction is provided (NO in step S16).

When the end instruction is provided (YES in step S16), a series of pieces of processing is ended.

<I. Use Case>

For example, it is conceivable that, when any one of the input signals changes from "1" (True) to "0" (False), the safety controller performs the safety operation to stop a certain facility or machine. Then, it is conceivable that the input signal returns from "0" to "1". The change of the input signal is attributed to the fact that the target object does not exist in the detection range of the safety light curtain, the fact that the door monitored with the safety door switch is closed after opened once, and an external factor such as an environmental factor.

In such cases, it is difficult to identify a factor that stops the facility or machine by the safety operation of the safety controller. In the usual safety component, it is difficult to identify the factor because the function of recording the change of the state value is not implemented in the safety component. In the case that plural safety components are associated with the factor, sometimes it is not clear that the stop of the facility or machine is caused by one safety component.

In such cases, the use of the collection function and visualization function of an embodiment checks the performance of the safety operation by the reproduction of the operating state of the safety program, so that the factor can easily be identified.

<J. Advantage>

According to an embodiment, in the case that the safety operation is performed by a certain factor, the operating state of the safety program is sequentially reproduced, and whereby the factor of the performance of the safety operation can easily be identified. Because the factor can easily be identified, the safety component can properly be maintained after the introduction.

It is to be understood that a disclosed embodiment is illustrative only, and is not restrictive. The scope of the invention is therefore to be determined solely by the appended claims, and the meanings equivalent to the claims and all the changes of the invention fall within the scope of the invention.

The invention claimed is:

1. A safety system comprising:
  a safety controller comprising a processor configured with a program to execute a safety program to perform operations comprising:
    operation as a collection unit configured to collect, over a predetermined period: input values comprising values of a previously-selected input signal input to the safety controller; and output values comprising values of a previously-selected output signal output from the safety controller; and operation as a visualization unit configured to: reproduce a behavior of the safety program over a predetermined period by calculating expected output values based on the input values and the safety program; and visually express an operating state of the safety program at an appointed point of time in the predetermined period to facilitate maintenance of the safety system by displaying the output values in contrast with the expected output values.

2. The safety system according to claim 1, wherein the processor is configured with the program such that operation as the visualization unit comprises operation as a unit configured to schematize and display a combination of commands included in the safety program.

3. The safety system according to claim 2, wherein the processor is configured with the program such that operation as the visualization unit further comprises operation as a unit configured to change a display mode of a corresponding element comprised in the schematized display according to the input value, an internal value, and an output value, the internal value and the output value being calculated according to the input value.

4. The safety system according to claim 1, wherein the processor is configured with the program such that operation as the visualization unit comprises operation as the visualization unit that outputs a timing chart indicating the input values collected over the predetermined period together with the operating state of the safety program.

5. The safety system according to claim 1, wherein the processor is configured with the program such that operation as the visualization unit comprises operation as the visualization unit that displays the output values collected over the predetermined period in parallel with the expected output values.

6. The safety system according to claim 1, further comprising a first setting support unit comprising a processor configured with a program to perform operations comprising extracting an input signal used in a command related to a safety function comprised in the safety program, and setting an input signal as a collection target of the collection unit according to selection of the extracted input signal.

7. The safety system according to claim 6, wherein the processor of the first setting support unit is configured with the program to perform operations further comprising:

operation as a unit configured to display a list of input signals constructed with at least a part of the extracted input signal together with an object receiving the selection; and operation as a unit configured to set the input signal corresponding to the selected object to the collection target.

8. The safety system according to claim 6, further comprising a second setting support unit comprising a processor configured with a program to perform operations comprising extracting at least one of the input and output signals used in the command related to the safety function comprised in the safety program, and to set a collection condition according to selection of a result of the extraction.

9. The safety system according to claim 1, wherein the processor is configured with the program such that operation as the collection unit comprises operation as the collection unit that starts collection of the input values over the predetermined period in response to a predetermined collection condition.

10. The safety system according to claim 1, wherein the processor is configured with the program such that operation as the collection unit comprises operation as the collection unit that starts collection of the input values over the predetermined period in response to a predetermined collection condition, the input values comprising a value of the input signal before a point of time at which the collection condition is established.

11. The safety system according to claim 1, wherein the processor is configured with the program such that operation as the visualization unit comprises operation as the visualization unit that displays only a part related to the input values collected over the predetermined period in the safety program.

12. The safety system according to claim 1, wherein the safety controller comprises a safety input unit configured to receive an input signal, the safety input unit comprising an input processor configured to decide the input value dealt with by the safety controller according to a rule defined previously from a plurality of values indicated by one or a plurality of input signals, and the processor is configured with the program such that operation as the collection unit comprises operation as the collection unit that collects a value, which is used to determine the input signal with the input processor of the safety input unit.

13. The safety system according to claim 1, wherein the processor is configured with the program such that the collection unit is implemented in a control device connected to the safety controller.

14. A non-transitory computer-readable storage medium storing thereon a program to be executed with a computer in a safety system comprising a safety controller that executes a safety program, the program causing the computer to perform operations comprising:

collecting, over a predetermined period, input values comprising values of a previously-selected input signal input to the safety controller;

collecting output values comprising values of a previously-selected output signal output from the safety controller;

reproducing a behavior of the safety program over the predetermined period by calculating expected output values based on the input values and the safety program; and visually expressing an operating state of the safety program at an appointed point of time in the predetermined period to facilitate maintenance of the safety system by displaying the output values in contrast with the expected output values.

15. A method performed in a safety system comprising a safety controller that executes a safety program, the method comprising:

collecting, over a predetermined period, input values comprising values of a previously-selected input signal input to the safety controller;

collecting output values comprising values of a previously-selected output signal output from the safety controller;

reproducing a behavior of the safety program over the predetermined period by calculating expected output values based on the input values and the safety program; and visually expressing an operating state of the safety program at an appointed point of time in the predetermined period to facilitate maintenance of the safety system by displaying the output values in contrast with the expected output values.

16. The method according to claim 15, wherein visually expressing the operating state of the safety program further comprises schematizing and displaying a combination of commands included in the safety program.

17. The method according to claim 16, further comprising changing a display mode of a corresponding element included in the schematized display according to the input values, an internal value, and an output value, the internal value and the output value being calculated according to the input values.

18. The method according to claim 15, further comprising outputting a timing chart indicating the input values collected over the predetermined period together with the operating state of the safety program.

19. The method according to claim 15, further comprising displaying the output values collected over the predetermined period in parallel with the expected output values.

* * * * *